US012325244B2

(12) United States Patent
Soma et al.

(10) Patent No.: US 12,325,244 B2
(45) Date of Patent: Jun. 10, 2025

(54) INK JET RECORDING APPARATUS

(71) Applicant: CANON KABUSHIKI KAISHA, Tokyo (JP)

(72) Inventors: Kanako Soma, Kanagawa (JP); Takumi Otani, Kanagawa (JP); Yoshiaki Murayama, Tokyo (JP); Sonoko Egawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 18/067,644

(22) Filed: Dec. 16, 2022

(65) Prior Publication Data

US 2023/0202186 A1 Jun. 29, 2023

(30) Foreign Application Priority Data

Dec. 23, 2021 (JP) ................................ 2021-209576
Sep. 15, 2022 (JP) ................................ 2022-147450

(51) Int. Cl.
*B41J 2/175* (2006.01)
*B41J 2/165* (2006.01)

(52) U.S. Cl.
CPC ....... *B41J 2/17566* (2013.01); *B41J 2/16505* (2013.01); *B41J 2/16507* (2024.05); *B41J 2/16508* (2013.01); *B41J 2002/16573* (2013.01)

(58) Field of Classification Search
CPC ............... B41J 2/17566; B41J 2/16505; B41J 2/16507; B41J 2/16508; B41J 2002/16573
See application file for complete search history.

(56) References Cited

U.S. PATENT DOCUMENTS

2015/0231886 A1* 8/2015 Yamazaki ............ B41J 2/16526 347/35
2015/0251445 A1* 9/2015 Sayama ............... B41J 2/04593 347/16

FOREIGN PATENT DOCUMENTS

JP 2008221796 A 9/2008

* cited by examiner

*Primary Examiner* — Geoffrey S Mruk
(74) *Attorney, Agent, or Firm* — Canon U.S.A., Inc. IP Division

(57) ABSTRACT

An ink jet recording apparatus includes a cap, a control unit, and a recording unit having nozzle arrays each including a plurality of nozzles for ejecting ink in an image recording operation. The cap receives ink preliminarily ejected from the recording unit. The control unit controls an ejection operation to eject ink in response to receiving a recording command to cause an amount of ink ejected from a first nozzle group in a first preliminary ejection executed prior to the recording operation of the image to be smaller than an amount of ink ejected from a second nozzle group different from the first nozzle group in a second preliminary ejection executed prior to the recording operation of the image in a case where the recording command includes an instruction for recording the image by using the second nozzle group without using the first nozzle group among the plurality of nozzles.

16 Claims, 23 Drawing Sheets

INK JET RECORDING APPARATUS

BACKGROUND

Field

The present disclosure relates to an ink jet recording apparatus for recording an image on a recording medium and a control method thereof.

Description of the Related Art

Conventionally, there has been known an ink jet recording apparatus which records an image on a recording medium by applying ink thereto. In a case where the above-described ink jet recording apparatus does not either record an image or eject ink from nozzles (ejection ports) for a long time, moisture contained in the ink evaporates, so that the ink is thickened. This may result in occurrence of ejection failure of the ink from the nozzles. In order to prevent occurrence of the above-described ejection failure, the ink jet recording apparatus executes what is called a preliminary ejection, i.e., an operation for ejecting and discharging thickened ink in the nozzles to a cap at a timing when a recording operation of an image is not executed.

In a configuration discussed in Japanese Patent Application Laid-Open No. 2008-221796, in order to prevent an overflow of ink ejected to a cap, an amount of ink ejected to the cap through a preliminary ejection is calculated, and an idle suction operation for discharging ink to the outside of the cap is executed when the amount of ink stored in the cap is a threshold value or more.

SUMMARY

According to an aspect of the present disclosure, an ink jet recording apparatus includes a recording unit configured to execute a recording operation of an image and on which nozzle arrays each including a plurality of nozzles for ejecting ink onto a recording medium are arranged, a cap configured to receive ink preliminarily ejected from the recording unit, and a control unit configured to control an ejection operation of ink ejected from the recording unit in response to receipt of a recording command to cause an amount of ink ejected from a first nozzle group in a first preliminary ejection executed prior to the recording operation of the image to be smaller than an amount of ink ejected from a second nozzle group different from the first nozzle group in a second preliminary ejection executed prior to the recording operation of the image in a case where the recording command includes an instruction for recording the image by using the second nozzle group without using the first nozzle group among the plurality of nozzles.

Further features of the present disclosure will become apparent from the following description of exemplary embodiments with reference to the attached drawings.

DESCRIPTION OF THE EMBODIMENTS

Hereinafter, an exemplary embodiment of the present disclosure will be described with reference to the appended drawings. In an example where a recording command includes an instruction for recording an image without using some nozzles, an amount of ink stored in a cap because of a preliminary ejection can be reduced by controlling an ejection operation to prevent the nozzles not used for recording from executing a preliminary ejection.

Figure 1:
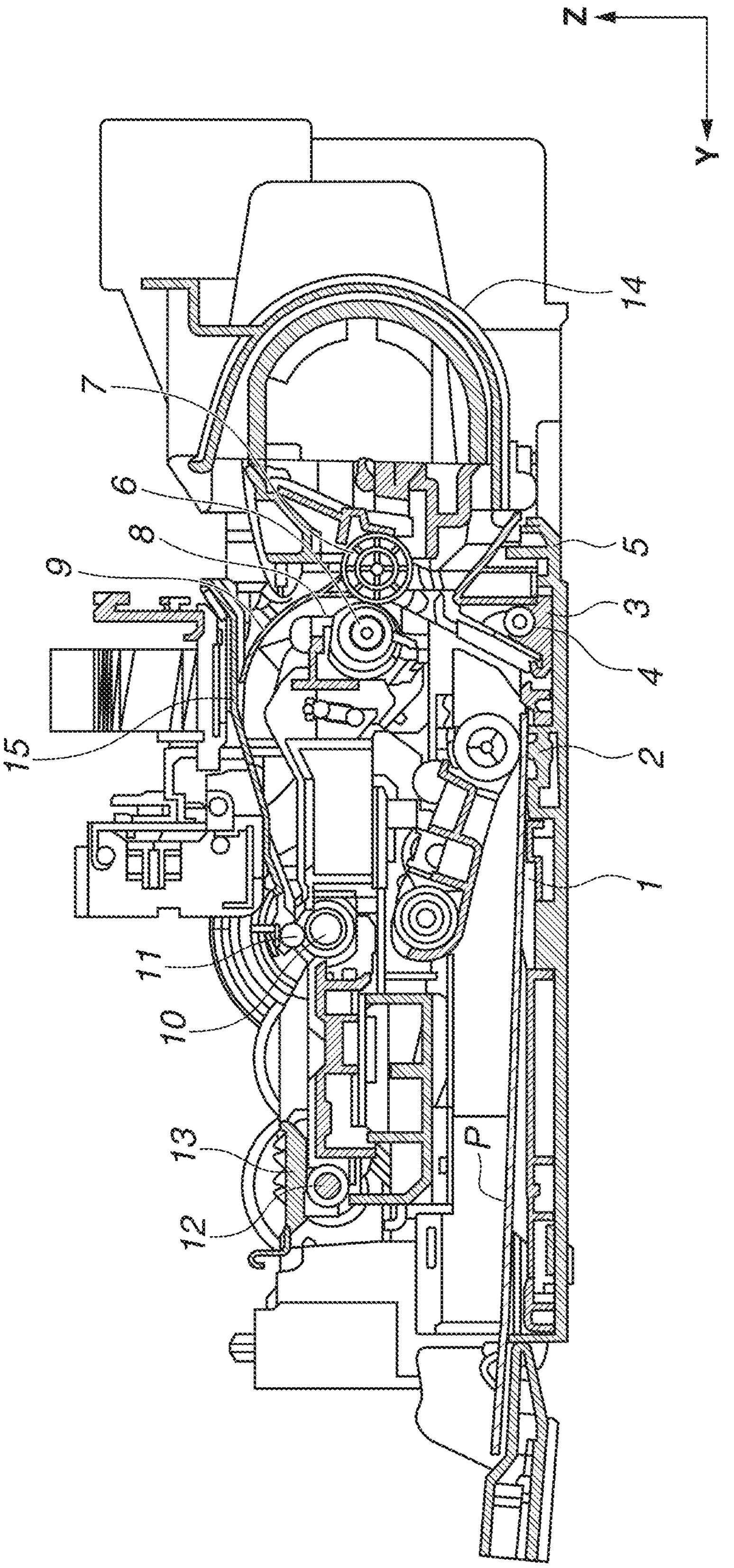
FIG. 1 is a longitudinal cross-sectional diagram illustrating an entire recording apparatus according to a first exemplary embodiment.

FIG. 1 is a cross-sectional diagram illustrating an entire ink jet recording apparatus according to a first exemplary embodiment. When a recording command is transmitted to the ink jet recording apparatus from a host apparatus such as a personal computer (PC), a control unit drives a motor 21 serving as a driving source of each mechanism. The motor 21 will be described below with reference to FIG. 2. A sheet feeding mechanism 2, an intermediate roller 6, a conveyance roller 10 arranged on a downstream side of the intermediate roller 6, and a discharge roller 12 arranged on a downstream side of the conveyance roller 10 are driven by the motor 21.

The sheet feeding mechanism 2 pushes and conveys recording media P stacked on a sheet feeding tray 1, and separates the recording media P one from another by making the recording media P abut on a separation member 4. The sheet feeding mechanism 2 conveys a separated recording medium P to the intermediate roller 6 and a pinch roller 7 that operate as a pair. A leading end of the recording medium P comes in contact with an outer circumference of a U-shaped paper guide after passing through the intermediate roller 6, and a conveyance direction thereof is reversed along the paper guide. Then, the leading end of the recording medium P reaches the conveyance roller 10 and a pinch roller 11 that operate as a pair. When the leading end of the recording medium P approaches a nip portion of the conveyance roller 10, a position of the leading end is adjusted depending on a type of the recording medium P, so that skew feeding of the recording medium P is corrected. The above-described adjustment of the position of the leading end is also called "leading end registration". When the leading end registration is executed, the conveyance roller 10 can also be rotated in a direction in which the recording medium P is conveyed backward, i.e., a direction opposite to the conveyance direction, by being driven by the motor 21. Meanwhile, the intermediate roller 6 is constantly rotated forward in the conveyance direction, i.e., a direction in which the recording medium P is discharged, regardless of a driving direction of the motor 21. With the above-described configuration of the two rollers 6 and 10, a loop can be formed on the recording medium P at a position just before the conveyance roller 10. When the recording medium P has reached the conveyance roller 10, the motor 21 reverses the driving direction to make the conveyance roller 10 rotate in a direction in which the recording medium P is conveyed backward. Then, the conveyance roller 10 is rotated in a forward direction again, and the recording medium P is conveyed in a discharge direction. In this way, the leading end registration is completed. After the leading end registration is executed, the recording medium P is conveyed to a platen, and a sheet feeding operation is completed.

A recording unit 714 for scanning the recording medium P in a direction intersecting the conveyance direction of the recording medium P is arranged on the platen. The recording apparatus according to the present exemplary embodiment is what is called a serial recording-type recording apparatus which includes the recording unit 714 configured to scan the recording medium P in a scanning direction (the X direction in FIG. 8C) intersecting the conveyance direction (the Y direction in FIG. 8C). While the scanning is being executed, droplets of ink are ejected from nozzles (ejection ports) of a recording head 717 mounted on the recording unit 714 to the recording medium P conveyed to the platen, so that an image is recorded on the recording medium P.

Figure 8A:
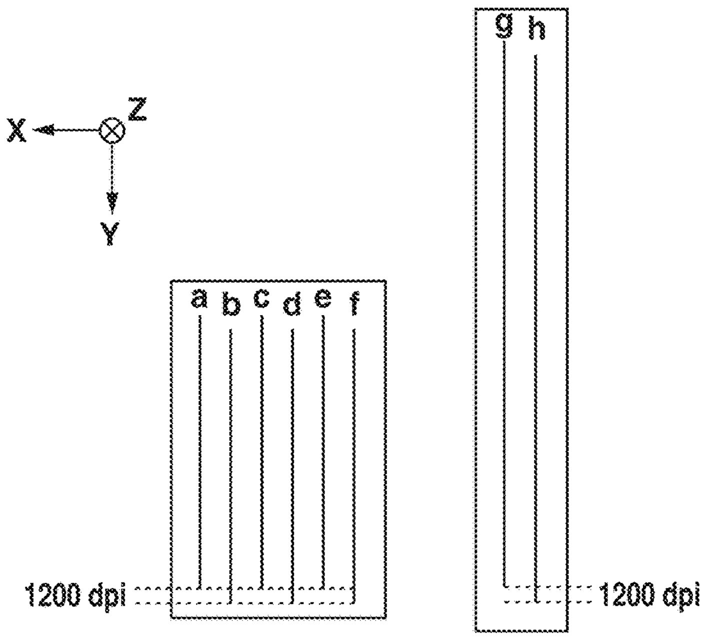
FIGS. 8A, 8B, and 8C are diagrams illustrating a recording head.
Figure 8B:
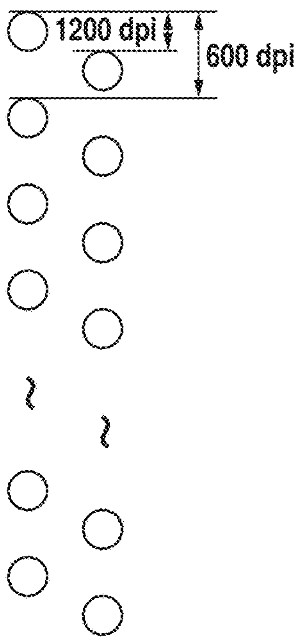
Figure 8C:
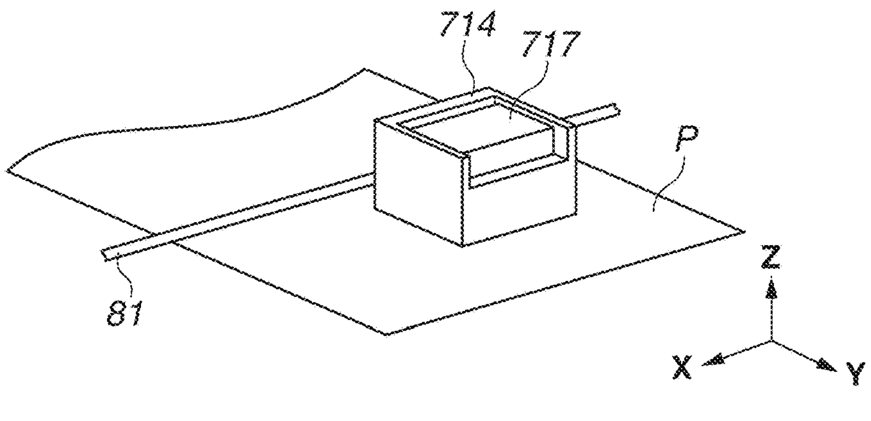

FIGS. 8A, 8B, and 8C are schematic diagrams illustrating the recording unit 714 and the recording head 717. FIG. 8A is a conceptual diagram illustrating a nozzle surface (ejection port surface) on which nozzle arrays including a plurality of nozzles (ejection ports) for discharging ink are arranged. FIG. 8B is a diagram illustrating arrangement of the nozzles included in each of the nozzle arrays. Each of the nozzle arrays includes the nozzles arranged at an interval of 600 dots per inch (dpi) in the Y direction in FIG. 8A. In the nozzle arrays, two nozzle arrays for each color ink are arranged in a staggered pattern where the two nozzle arrays are shifted from each other by 1200 dpi in the Y direction. In other words, recording resolution in the Y direction of each color ink is 1200 dpi.

In addition, an ink flow path (not illustrated) for supplying ink to each of the nozzles is arranged on the recording head 717. Further, a recording element for generating energy used for ejecting ink as droplets is arranged inside each of the nozzles. In the present exemplary embodiment, an electro-thermal conversion element which converts electric energy into thermal energy is used as the recording element. However, the recording element is not limited thereto, and a piezoelectric conversion element can also be used.

In FIG. 8A, nozzle arrays a and b include nozzles for discharging a cyan ink, nozzle arrays c and d include nozzles for discharging a magenta ink, and nozzle arrays e and f include nozzles for discharging a yellow ink. Similarly, nozzle arrays g and h include nozzles for discharging a black ink. 256 nozzles are included in each of the nozzle arrays a to f for the cyan, magenta, and yellow inks, and 640 nozzles are included in each of the nozzle arrays g and h for the black ink.

FIG. 8C is a diagram illustrating scanning executed by the recording unit 714 and the recording head 717. As illustrated in FIG. 8C, the recording unit 714 is supported by a rail 81, and scans the recording medium P in a direction intersecting the conveyance direction of the recording medium P on the platen. The recording head 717 is mounted on the recording unit 714 in a removable state. The recording head 717 records an image on the recording medium P, which is conveyed to the platen by the conveyance roller 10, by ejecting ink thereto while reciprocally moving relative to the recording medium P and scanning the recording medium P.

In the present exemplary embodiment, what is called a multi-pass recording method is employed, in which a recording operation of an image in a unit area of the recording medium P is completed by a plurality of times of scanning executed on the unit area. A recording scan executed by the recording unit 714 is also called a "pass", and the number of times of recording scans, which the recording head 717 executes in order to complete a recording operation with respect to a predetermined unit area, is called "the number of passes". When recording of an image is ended, the recording medium P is conveyed and discharged forward in the conveyance direction by a discharge roller 12 and a spur 13 that operate as a pair.

Figure 2:
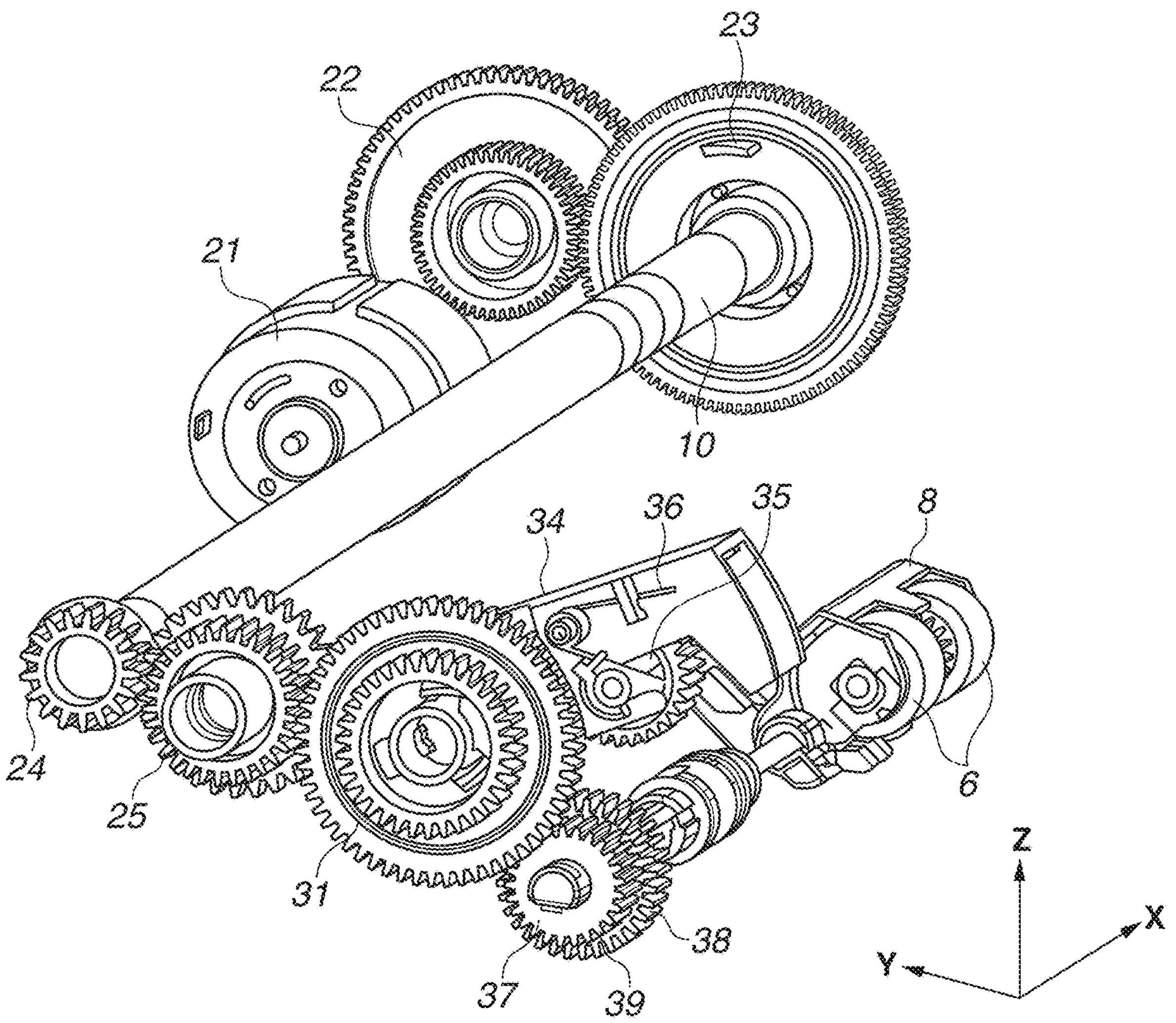
FIG. 2 is a perspective diagram illustrating a driving mechanism of the recording apparatus.

FIG. 2 is a perspective diagram illustrating a driving mechanism of the ink jet recording apparatus according to the present exemplary embodiment. In FIG. 2, a driving force transmission mechanism which transmits driving force of the motor 21 to the conveyance roller 10 and the intermediate roller 6 is illustrated in detail. In the present exemplary embodiment, both the conveyance roller 10 and the intermediate roller 6 are commonly driven by the motor 21. With this configuration, a size and cost of the recording apparatus main body can be reduced.

A gear (not illustrated) attached to a rotation shaft of the motor 21 is coupled to a conveyance input gear 23 attached to a shaft of the conveyance roller 10 via an idler gear 22. A code wheel (not illustrated) on which markings are formed is attached to the conveyance input gear 23, so that a rotation amount of the motor 21 can be detected thereby. A rotation amount of the conveyance roller 10 can be controlled by reading the code wheel by an encoder sensor (not illustrated). A conveyance output gear 24 is attached to another end portion of the shaft of the conveyance roller 10. The driving force is transmitted to a sun gear 31 from the conveyance output gear 24 via an idler gear 25. The sun gear 31 is configured as a clutch gear.

Figure 3:
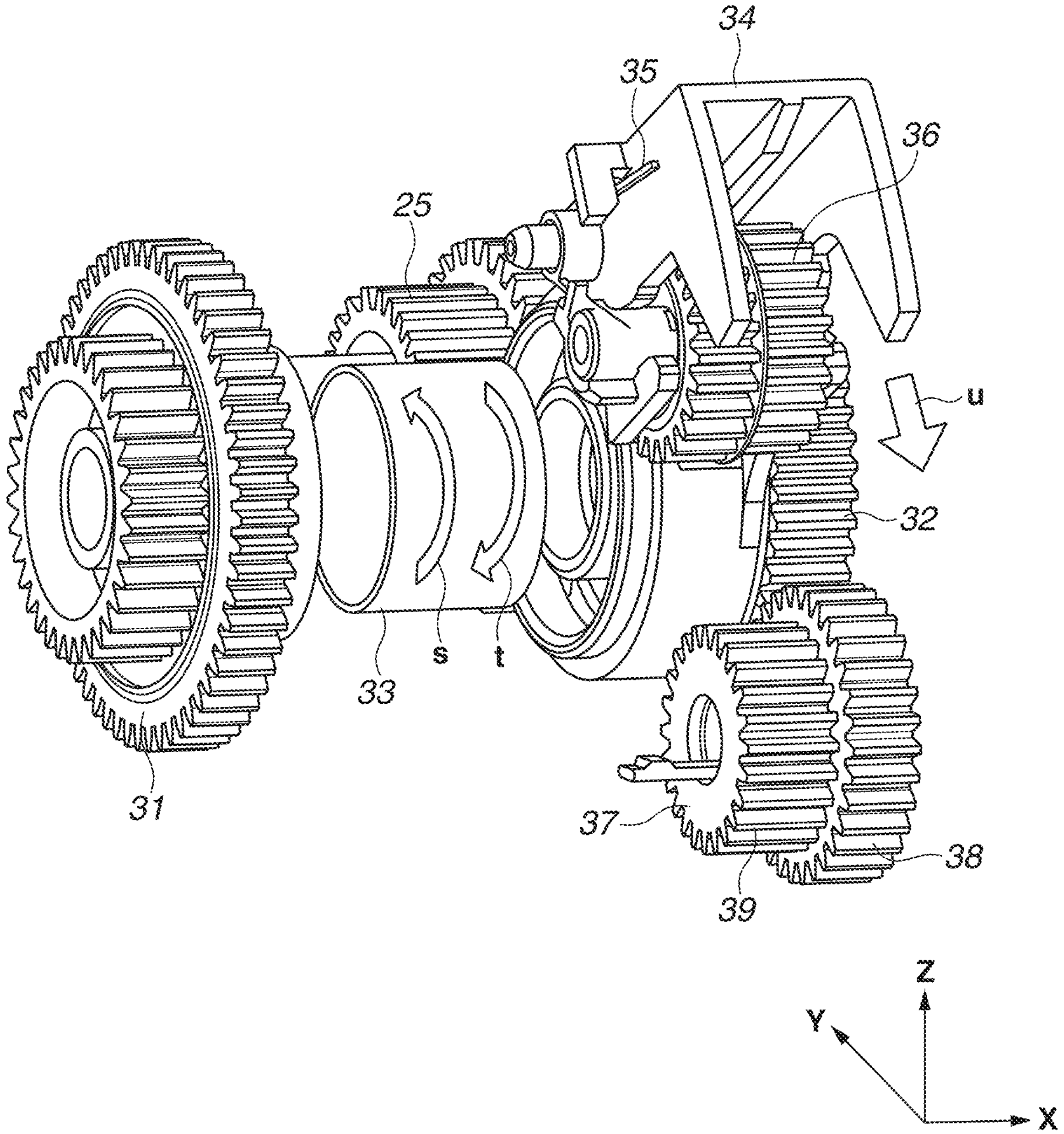
FIG. 3 is a perspective diagram illustrating a configuration of a clutch gear.

FIG. 3 is a perspective diagram illustrating a configuration of the clutch gear illustrated in FIG. 2. As illustrated in FIG. 3, a spring 33 is arranged on the inner side of the sun gear 31. The spring 33 is tightened when the sun gear 31 is rotated in a forward direction, so that a sun gear 32 can be rotated together with the sun gear 31. On the other hand, when the sun gear 31 is rotated in a reverse direction, the spring 33 is loosened. Thus, when a load is applied to the sun gear 32, the sun gears 31 and 32 slip and cannot be rotated together. Further, a swing arm 34 is arranged on a shaft of the sun gear 31, and a planetary gear 35 is attached to the swing arm 34. A swing arm spring 36 is arranged at a position between the planetary gear 35 and the swing arm 34, and the swing arm 34 is rotated together with the sun gear 31 when the sun gear 31 is rotated by friction. A step 38 of a multistep gear 37 is coupled to the sun gear 32. Further, a step 39 of the multistep gear 37 is arranged at a position where the step 39 can be coupled to the planetary gear 35.

With the above-described configuration, when the sun gear 31 is rotated in the forward direction indicated by an arrow s, driving force applied to the sun gear 31 is transmitted to the step 38 of the multistep gear 37 via the sun gear 32 rotated together with the sun gear 31. On the other hand, when the sun gear 31 is rotated in the reverse direction indicated by an arrow t, the swing arm 34 is moved in a direction indicated by an arrow u in FIG. 3 to make the planetary gear 35 be coupled to the step 39 of the multistep gear 37, so that the driving force is transmitted to the multistep gear 37. When the sun gear 31 is rotated in the reverse direction, the sun gear 32 easily slips and does not interrupt driving thereof because the sun gear 32 is a clutch gear. By the above-described transmission method, the multistep gear 37 is rotated in a same direction regardless of whether the sun gear 31 is rotated forward or backward.

Figure 4:
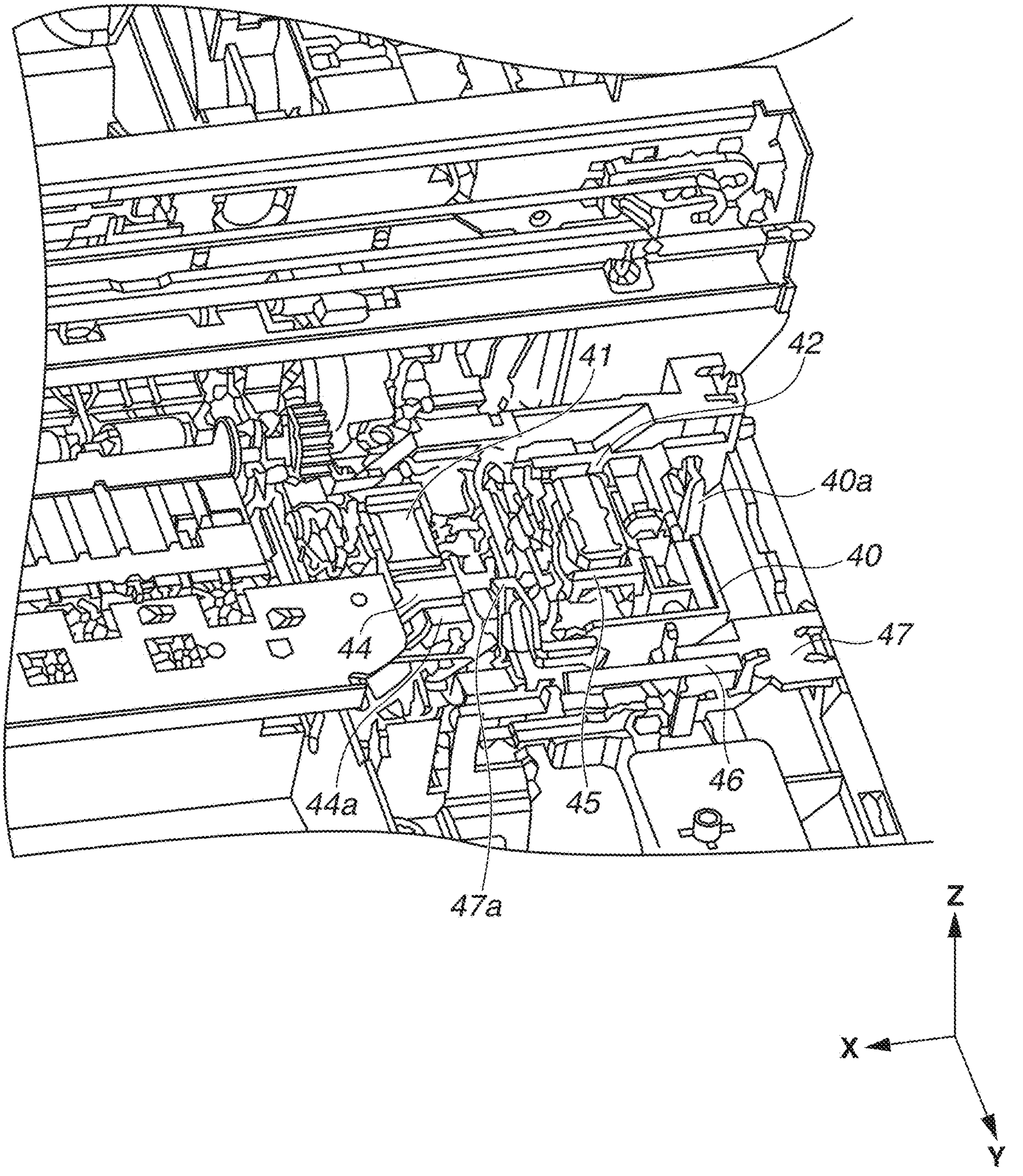
FIG. 4 is a perspective diagram illustrating a recovery mechanism portion of the recording apparatus.

FIG. 4 is a perspective diagram illustrating a recovery mechanism. The recovery mechanism according to the present exemplary embodiment is used for maintaining the ink ejection performance of the recording head 717. In FIG. 4, a slider 40 follows the movement of the recording head 717 in a reciprocating movement direction, and is slidable in an area outside a recording area where an image is recorded. Further, the slider 40 can move in a direction in which the ink is ejected, i.e., a direction perpendicular to an ejection port surface of the color inks and an ejection port surface of the black ink of the recording head 717. The above-described movement of the slider 40 enables caps 41 and 42 to move close to (come into contact with) and move away from the ejection port surfaces of the recording head 717.

The cap 41 is used for the ejection port surface of the cyan, magenta, and yellow color inks, and the cap 42 is used for the ejection port surface of the black ink. Cap holders 44 and 45 are mounted on the slider 40. Depending on the movement of the recording head 717, the slider 40 can move in a moving direction of the recording unit 714 and a direction in which the caps 41 and 42 move close to or away from the ejection port surfaces of the color inks and the black ink of the recording head 717, in an area different from the recording area. Pump tubes 51*a* and 51*b* are respectively attached to the caps 41 and 42, and are also connected to a pump mechanism including a suction pump for generating negative pressure. By driving the suction pump, the recording apparatus can execute a recovery operation where ink is suctioned from the respective ejection ports via the caps 41 and 42.

Figure 5:
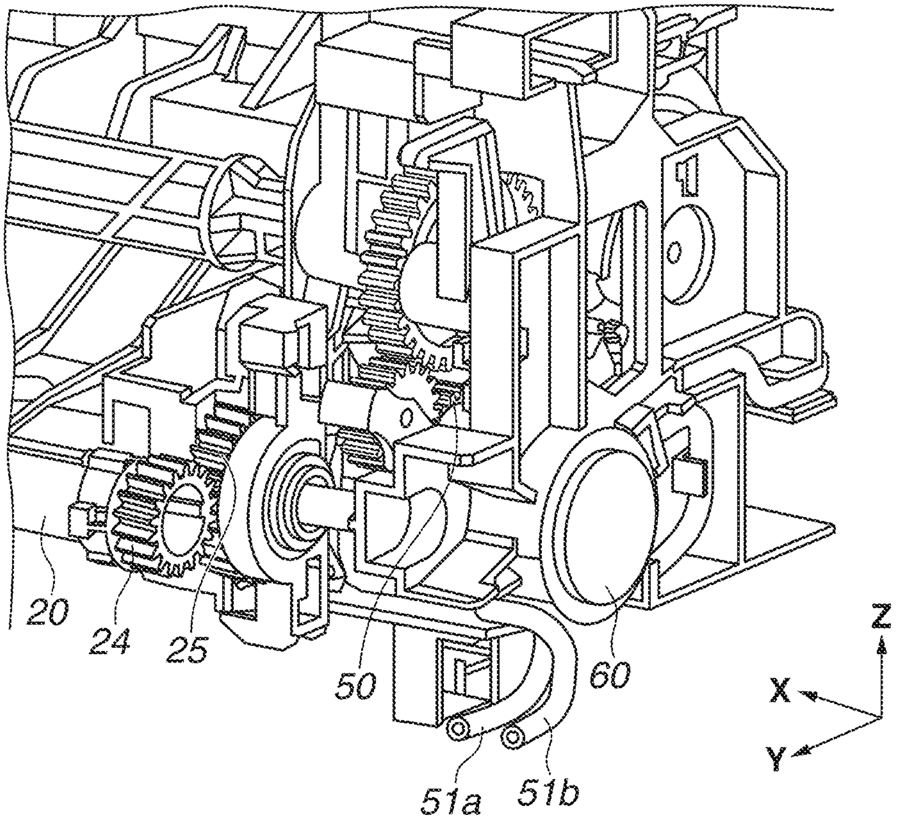
FIG. 5 is a perspective diagram illustrating a driving force transmission structure of the recording apparatus.
Figure 6:
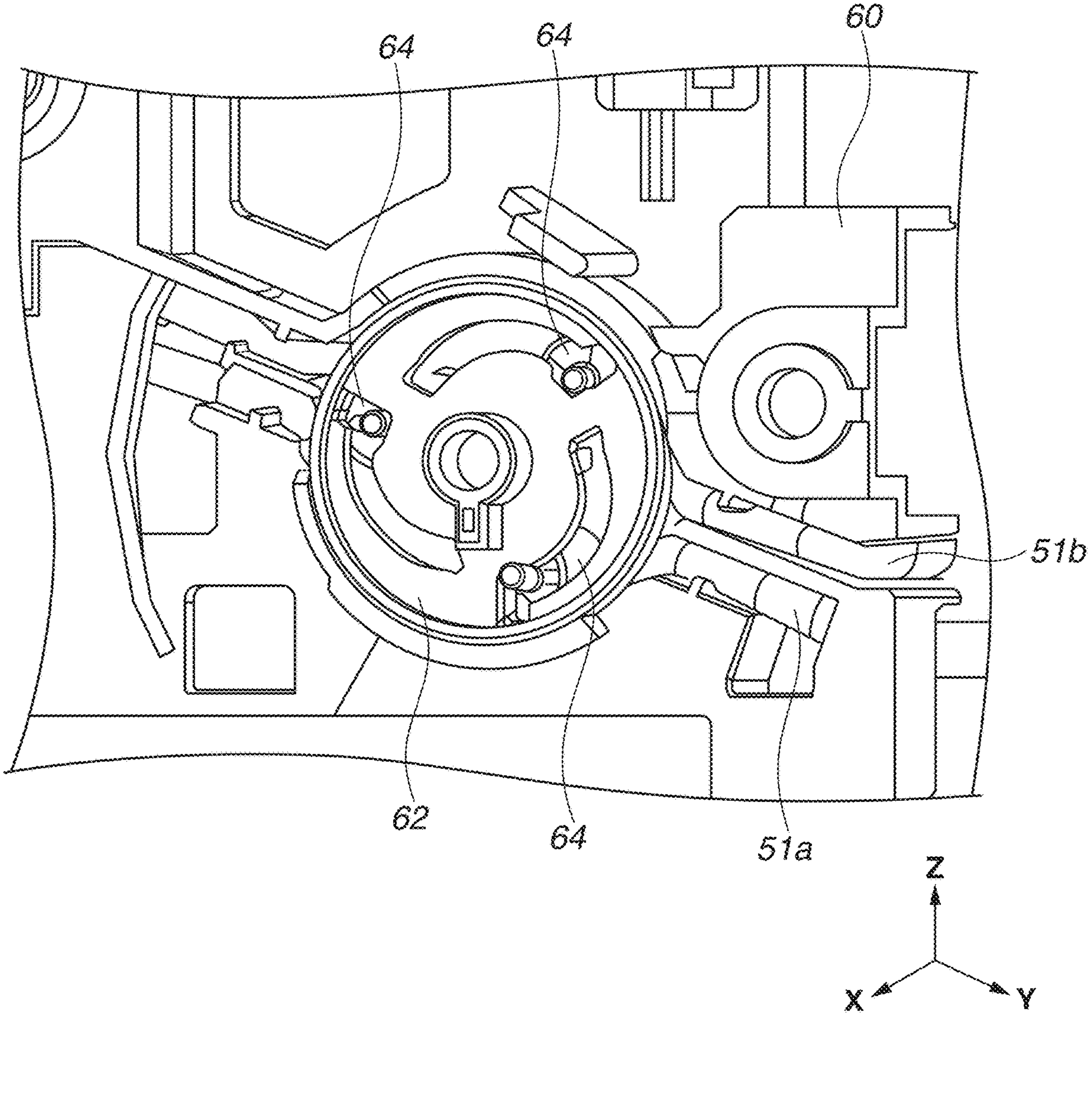
FIG. 6 is a perspective diagram illustrating a pump mechanism portion.

FIG. 5 is a perspective diagram of a driving force transmission structure illustrating a portion ranging from the conveyance roller 10 to the pump mechanism. FIG. 6 is a perspective diagram illustrating the pump mechanism. Pump rollers 64 are attached to a pump roller holder 62. The pump tubes 51*a* and 51*b* are rotatably inserted into a pump base 60 and arranged along a half of the inner circumferential wall of the pump base 60. When the conveyance roller 10 is rotated in the reverse direction by the driving force of the motor 21 in a state where the recording head 717 is capped, the driving force is transmitted to the pump roller holder 62 via the conveyance output gear 24, the idler gear 25, and a pump driving gear 50. The pump rollers 64 move cams arranged on the pump roller holder 62, so that the pump tubes 51*a* and 51*b* are squeezed by the inner wall of the pump base 60 and the pump rollers 64. When the conveyance roller 10 is continuously driven and rotated in the reverse direction, negative pressure is generated inside the pump tubes 51*a* and 51*b*.

When the negative pressure is generated in a state where the ejection port surfaces of the recording head 717 are respectively capped and closely attached to the caps 41 and 42, ink can be suctioned from the ejection ports of the recording head 717 via the caps 41 and 42. On the other hand, when the negative pressure is generated in a state where the ejection port surfaces are not capped, ink stored in the caps 41 and 42 because of a preliminary ejection can be suctioned and discharged by a discharge operation (idle suction operation). Further, by individually squeezing the pump tubes 51*a* and 51*b* in the idle suction operation, suction of ink from the nozzles or idle suction of ink stored in the caps 41 and 42 can individually be executed on the caps 41 and 42.

In order to release the negative pressure inside the pump tubes 51*a* and 51*b* after the suction operation for suctioning ink is ended, the pump roller holder 62 is driven and rotated in a reverse direction, i.e., the conveyance roller 10 is driven and rotated in the forward direction. The negative pressure inside the pump tubes 51*a* and 51*b* can be released by cancelling the squeezed state of the pump tubes 51*a* and 51*b* caused by the pump rollers 64. As described above, the pump tubes 51*a* and 51*b* are driven by the motor 21 which commonly drives the conveyance roller 10 and the intermediate roller 6, and negative pressure is generated inside the pump tubes 51*a* and 51*b* when the motor 21 drives the conveyance roller 10 in the reverse direction.

As described above, the recording apparatus according to the present exemplary embodiment executes the suction operation by generating negative pressure in the caps 41 and 42 by rotating the conveyance roller 10 in the reverse direction. Thus, in a state where the recording medium P is nipped by the conveyance roller 10, negative pressure cannot be generated in the caps 41 and 42 without moving the recording medium P in the Y direction. Accordingly, when a capping operation for making the recording head 717 be closely attached to the caps 41 and 42 and an idle suction operation for discharging ink stored in the caps 41 and 42 are to be executed, it is necessary to release the recording medium P nipped by the conveyance roller 10. However, the present disclosure is not limited to the recording apparatus having the above-described configuration.

Figure 7:
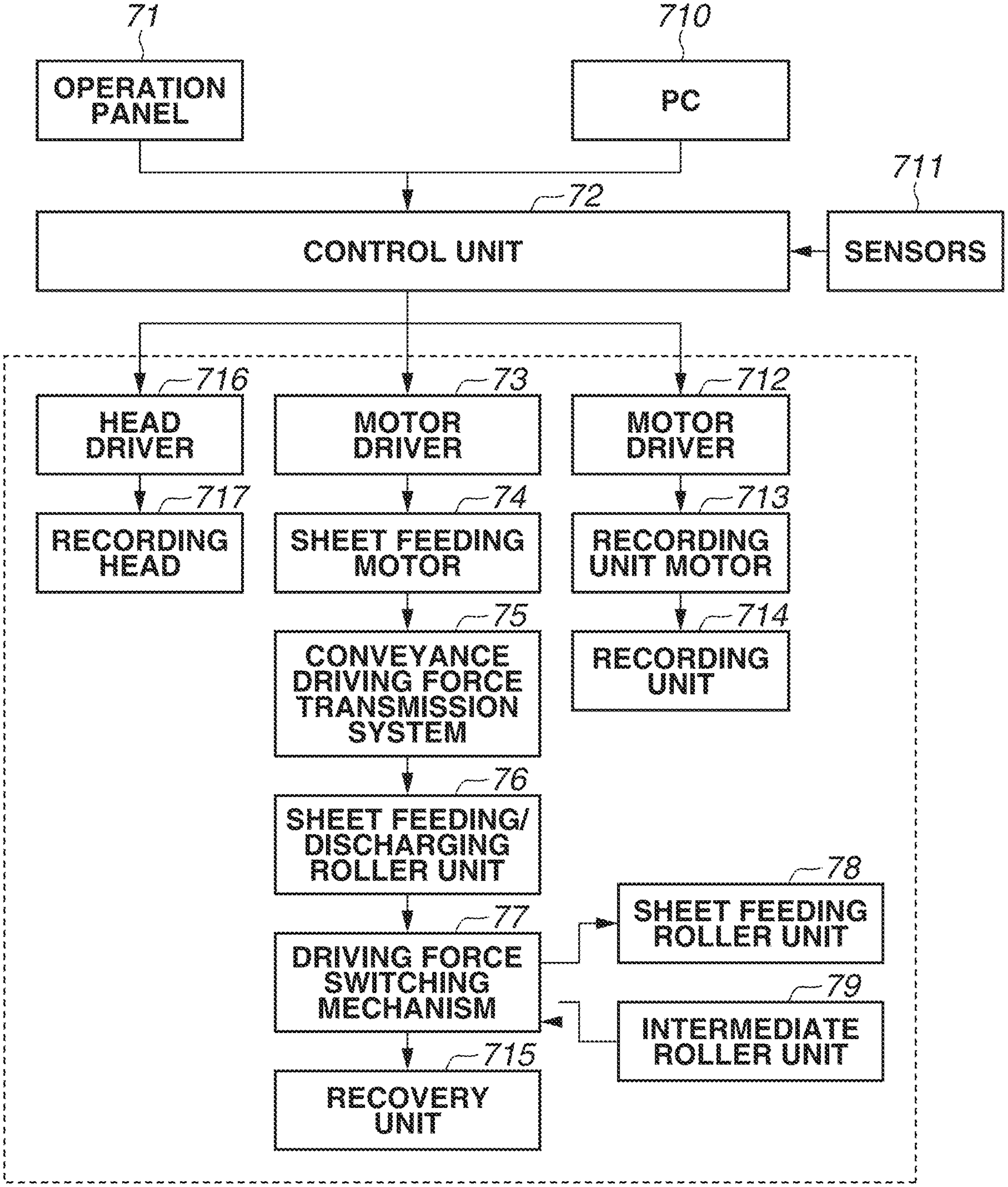
FIG. 7 is a block diagram schematically illustrating a configuration of a control unit of the recording apparatus.

FIG. 7 is a block diagram schematically illustrating a configuration of a control unit according to the present exemplary embodiment. A control unit 72 includes a central processing unit (CPU), a read-only memory (ROM), and a random access memory (RAM). The CPU executes processing based on a program stored in a memory such as the ROM or the RAM. The RAM is a volatile storage for temporarily storing a program and data. The ROM is a non-volatile storage for storing table data and a program used for the processing described below. As illustrated in FIG. 7, based on an input received from an operation panel 71 or a personal computer (PC) 710 connected to the control unit 72, the control unit 72 controls the following operations by outputting motor current control signals to motor drivers 73 and 712.

Based on a signal received from the motor driver 73, a sheet feeding motor 74 corresponding to the above-described motor 21 for driving the conveyance roller 10 drives a sheet feeding/discharging roller unit 76 via a conveyance driving force transmission system 75 and a driving force switching mechanism 77. Further, a sheet feeding roller unit 78 and an intermediate roller unit 79 respectively corresponding to the above-described conveyance roller 10 and the intermediate roller 6 are similarly driven thereby. The sheet feeding motor 74 drives the pump tubes 51*a* and 51*b* of a recovery unit (recovery mechanism) 715.

A recording unit motor 713 drives the recording unit 714 based on a signal received from the motor driver 712. A position of the recording medium P, the number of rotations of the conveyance roller 10, and a recording position of the recording unit 714 are detected by various sensors 711 arranged on a sheet feeding unit and the recording unit 714. The control unit 72 outputs appropriate control signals to the motor drivers 73 and 712 by receiving detection signals.

The control unit 72 further drives the recording head 717 by outputting recording data to a head driver 716. Recording data includes not only data of an image to be recorded but also preliminary ejection data used to maintain the ejection performance of the recording head 717. In the present exemplary embodiment, a pre-recording preliminary ejection, an in-recording preliminary ejection, and a stand-by preliminary ejection are executed as preliminary ejection operations. The pre-recording preliminary ejection is executed prior to the recording operation for recording an image on a recording medium, the in-recording preliminary ejection is executed while the recording operation is being executed, and the stand-by preliminary ejection is executed to be prepared for the next recording command. In the present exemplary embodiment, the recording apparatus executes the above-described preliminary ejections to discharge ink thickened in the vicinities of ejection ports, and ink is ejected to the caps 41 and 42. Through the preliminary ejections, the color inks are ejected to the cap 41, whereas the black ink is ejected to the cap 42.

Figure 9:
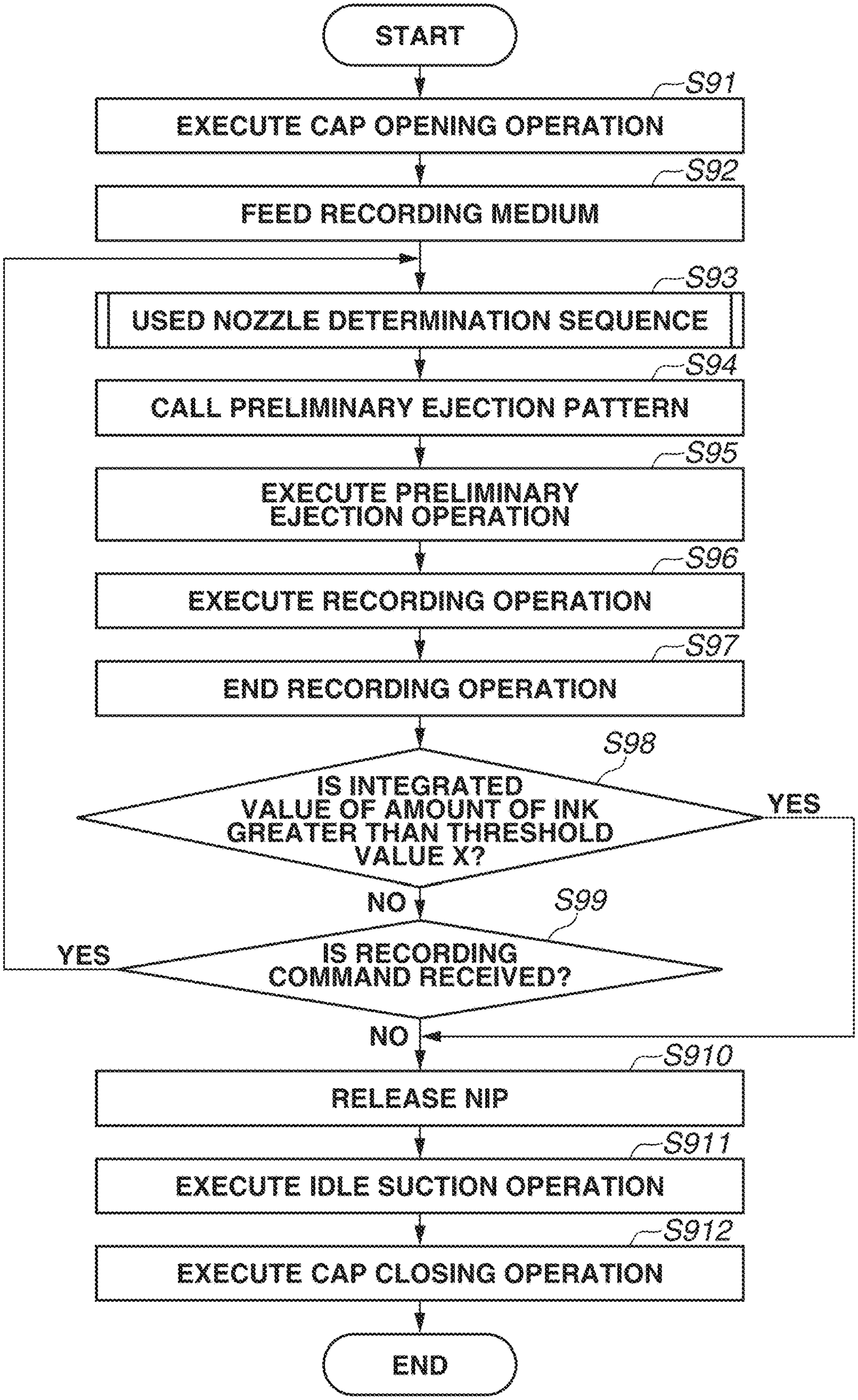
FIG. 9 is a flowchart illustrating control processing of the recording apparatus according to a first exemplary embodiment.

FIG. 9 is a flowchart illustrating a basic operation relating to the pre-recording preliminary ejection and the in-recording preliminary ejection executed in response to a recording command. In the following descriptions of the present specification, a letter "S" represents a "step" or a process. The processing is started when the recording apparatus receives a recording command.

First, in step S91, a cap opening operation is executed, so that the ejection port surfaces of the recording head 717 in contact with the caps 41 and 42 are separated from the caps 41 and 42. In step S92, the recording medium P is fed to a sheet feeding position. While the recording medium P is being fed thereto, in step S93, nozzles used for recording an image are determined in a used nozzle determination sequence. Herein, a "nozzle group" is a group including one or more nozzles included in the nozzle arrays arranged on the recording head 717. In step S94, based on a determination result acquired in step S93, a preliminary ejection pattern is read and acquired from the ROM included in the control unit 72. In step S95, based on the acquired preliminary ejection pattern, a preliminary ejection operation is executed on the caps 41 and 42. In step S96, a recording operation of the image is executed. Then, in step S97, the recording operation is ended. The pre-recording preliminary ejection and the in-recording preliminary ejection are included in the preliminary ejection operation executed in step S95. The pre-recording preliminary ejection is executed before a recording operation for recording an image on a recording medium is started, and the in-recording preliminary ejection is executed after the recording operation is started. The pre-recording preliminary ejection is executed before the recording head 717 ejects ink to the recording medium P. The in-recording preliminary ejection is executed based on the preliminary ejection pattern acquired in step S94, in a period after one recording scan is completed by the recording unit 714 and before a next recording scan is started thereby. The in-recording preliminary ejection may be executed every time the recording scan is executed, or may be executed every several times the recording scan is executed.

The control unit 72 counts an amount of ink ejected to each of the caps 41 and 42 in the preliminary ejection operation executed in step S95, and stores a counted value in the RAM of the control unit 72. In the present exemplary embodiment, counted values are integrated, and an integrated value stored in the RAM is reset when the ink stored in the caps 41 and 42 is discharged in the idle suction operation. After the recording operation is ended in step S97, in step S98, the integrated value of the amount of ink stored in the caps 41 and 42 is compared with a threshold value X stored in advance. If the integrated value of the amount of ink stored in the caps 41 and 42 is the threshold value X or less (NO in step S98), the processing proceeds to step S99, and the CPU stands by for a certain period of time until the next recording command is received. The preliminary ejection (stand-by preliminary ejection) may be executed in the stand-by period. In that case, an amount of ink ejected through the stand-by preliminary ejection is also added to the above-described integrated value. In a case where the recording command is received in the stand-by period, the processing returns to the used nozzle determination sequence in step S93, and the processing in step S93 and subsequent steps is executed repeatedly. On the other hand, in a case where the integrated value of the amount of ink stored in the caps 41 and 42 is greater than the threshold value X (YES in step S98), the processing proceeds to step S910. In step S910, the recording medium P is discharged, and a nip is released. Then, in step S911, in a state where the caps 41 and 42 are separated from the ejection port surfaces of the recording head 717, the CPU executes the idle suction operation to discharge ink stored in the caps 41 and 42 by rotating the conveyance roller 10 in the reverse direction. By executing the idle suction operation, the integrated value stored in the RAM is reset.

Then, in step S912, a cap closing operation is executed, in which the caps 41 and 42 are brought into contact with and closely attached to the ejection port surfaces. Then, the processing is ended.

The threshold value X to which the integrated value of the amount of ink stored in the caps 41 and 42 is compared is a value less than the capacity of the caps 41 and 42. Further, it is desirable that the integrated value be a value less than the cap capacity even if the pre-recording preliminary ejection and the in-recording preliminary ejection are executed in response to receipt of the next recording command.

Figure 10:
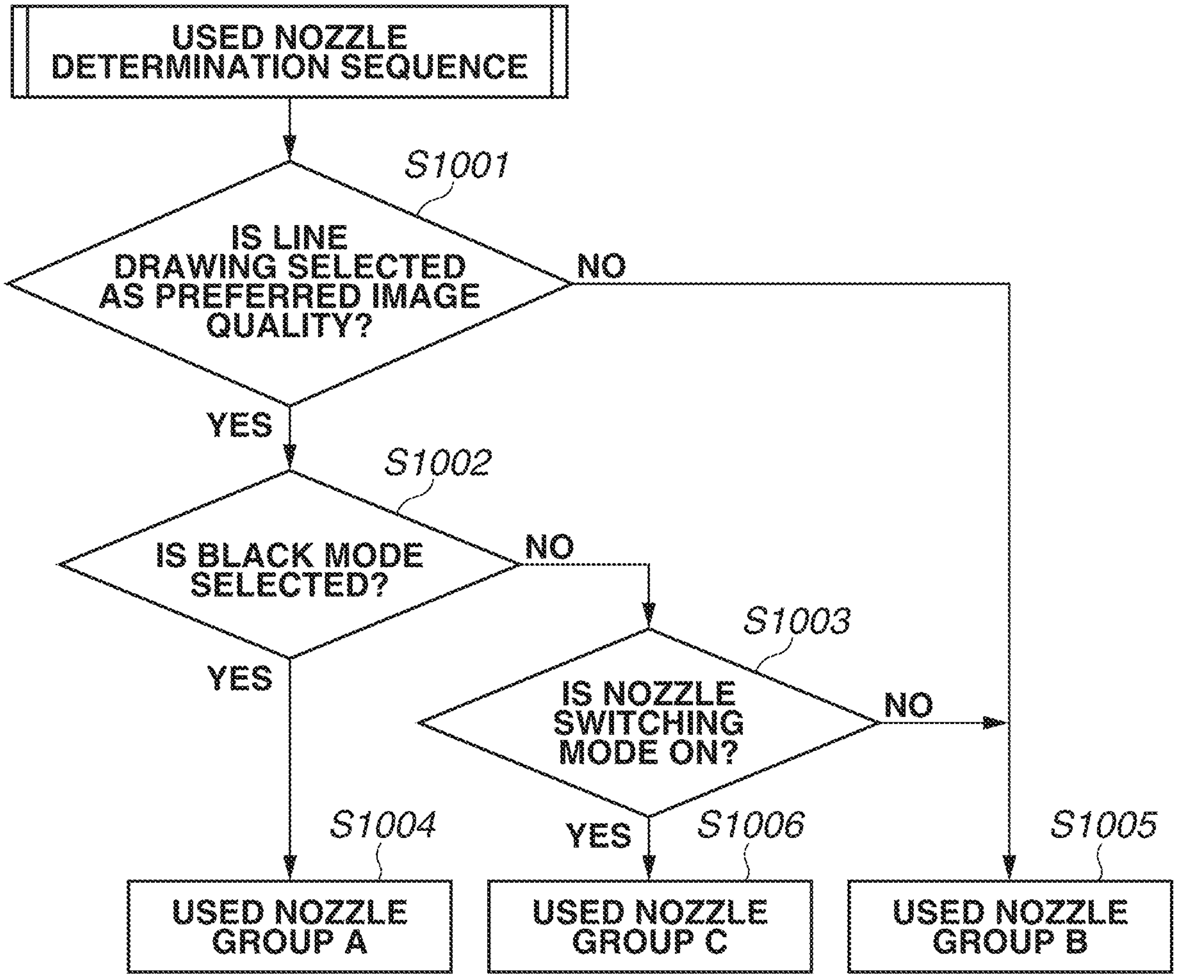
FIG. 10 is a flowchart illustrating a used nozzle determination sequence according to the first exemplary embodiment.

FIG. 10 is a flowchart illustrating an example of the used nozzle determination sequence executed in step S93. In the present exemplary embodiment, a received recording command includes an instruction which describes in what recording mode the image is to be recorded, and nozzles used for recording the image are specified in advance for each recording mode. In the used nozzle determination sequence illustrated in FIG. 10, among all of the nozzles, nozzles that execute the preliminary ejection are limited to a group of nozzles used for the recording depending on the recording mode. In this way, the amount of ink stored in the caps 41 and 42 through the preliminary ejection can be reduced.

Now, nozzle groups which are used for recording in different recording modes will be described.

In the present exemplary embodiment, a used nozzle group A (S1004) is used for recording when a preferred image quality and the recording mode are "Line Drawing" and "Black Mode", respectively. A used nozzle group B (S1005) is used for recording when the preferred image quality is not the line drawing, i.e., when a photograph mode such as "Photograph" is selected. While details will be described below, the used nozzle group A corresponds to nozzles included in a shaded area 1101 in FIG. 11A, and the used nozzle group B corresponds to nozzles included in shaded areas 1101 in FIG. 11B. A used nozzle group C (S1006) will be described below.

The description will return to the used nozzle determination sequence in FIG. 10. In step S1001, the CPU determines whether "Line Drawing" is selected as the preferred image quality. Generally, an ink jet recording apparatus allows a user to select a preferred image quality from options such as "Line Drawing" and "Photograph" via an operation panel or a printer driver installed in a PC. When "Line Drawing" is selected, an image is recorded at high speed mainly using a black ink. When "Photograph" is selected, an image is recorded using a plurality of color inks while suppressing color unevenness. As described above, all or some of the nozzles are used for recording depending on a purpose. In a case where the preferred image quality is determined as "Line Drawing" (YES in step S1001), the processing proceeds to step S1002. In a case where the preferred image quality is not determined as "Line Drawing" (NO in step S1001), the processing proceeds to step S1005, so that the used nozzle group B is used for recording.

In step S1002, the CPU determines whether the recording mode is a black mode which uses only the black ink for recording an image or a color mode which uses both the black ink and the color inks for recording an image. As illustrated in the configuration of the nozzle arrays a to h in FIG. 8A, a length of an area of the nozzle arrays g and h including nozzles for ejecting the black ink is longer than a length of an area of the nozzle arrays a to f including nozzles for ejecting the color inks. In the black mode for recording an image with only the black ink, high-speed recording is executed using all of the nozzles included in the black ink nozzle arrays g and h. In the color mode for recording an image with both of the black and color inks, recording using the black ink and recording using the color inks are executed with a time interval. In this way, occurrence of color unevenness in a recorded image can be prevented. In a case where the recording mode is determined as the black mode (YES in step S1002), the processing proceeds to step S1004, so that the used nozzle group A is used for recording. In a case where the recording mode is determined as the color mode (NO in step S1002), the processing proceeds to step S1003.

In step S1003, the CPU determines whether a nozzle switching mode is on or off, and switches the nozzles to be used for recording depending on a determination result. Further, the nozzles that execute the preliminary ejection are also determined based on the determination result. Details thereof will be described below.

FIGS. 11A, 11B, 11C, and 11D are schematic diagrams illustrating examples of the used nozzle groups according to the present exemplary embodiment. The example in FIG. 11A corresponds to the used nozzle group A (S1004), the example in FIG. 11B corresponds to the used nozzle group B (S1005), and the example in FIG. 11C corresponds to the used nozzle group C (S1006).

Figure 11A:
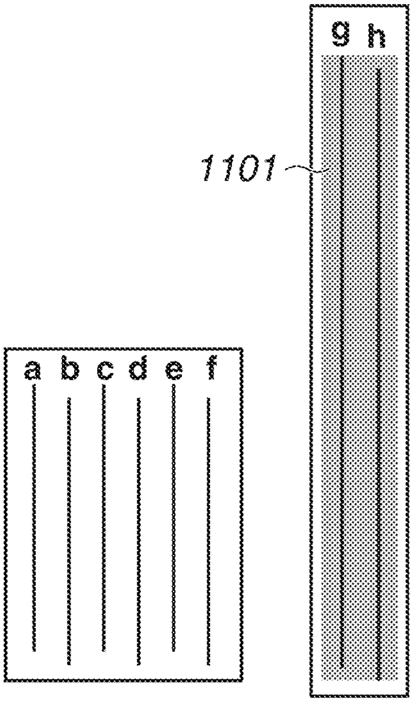
FIGS. 11A, 11B, 11C, and 11D are diagrams illustrating used nozzle groups.

In a case where the preferred image quality and the recording mode are respectively determined as "Line Drawing" and "Black Mode" in the above-described determination executed in steps S1001 and S1002, the used nozzle group A in FIG. 11A is used for recording. The nozzles included in the shaded area 1101 are used for recording, so that an image is recorded using all of the nozzles included in the black ink nozzle arrays g and h. In the black mode, an image is recorded with only the black ink. Thus, the nozzles of the color inks are not used for recording. Since all of the nozzles included in the black ink nozzle arrays g and h are used, a range recordable by one recording scan is long, so that an image can be recorded by the smaller number of times of scans. As a result, time taken to record one page can be shortened.

Figure 11B:
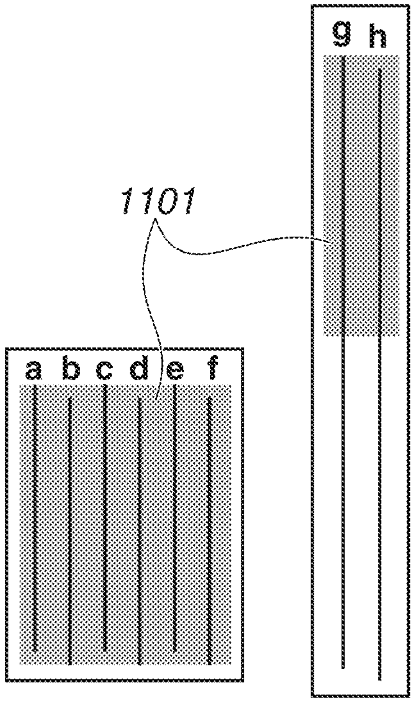

On the other hand, in a case where the preferred image quality is not determined as "Line Drawing", the used nozzle group B in FIG. 11B is used for recording. The nozzles included in the shaded areas 1101 are used for recording, so that some of the nozzles included in the black ink nozzle arrays g and h on the upstream side and all of the nozzles included in the color ink nozzle arrays a to f are used. As described above, the limited black ink nozzles are used, thus the black ink and the color inks can be ejected at different timings, so that occurrence of color unevenness can be prevented.

Figure 11C:
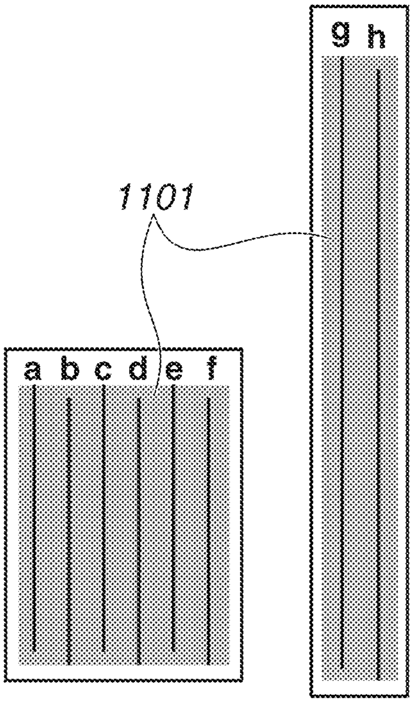

Determination on whether the nozzle switching mode is on or off executed in step S1003 and the used nozzle group C illustrated in FIG. 11C will now be described. When the nozzle switching mode is on, a recording operation of one page is executed while switching the used nozzle group for each recording scan. Hereinafter, an area recordable by one recording scan of the recording head 717 is called a "band".

It is assumed that "Line Drawing" and "Color Mode" are respectively selected as the preferred image quality and the recording mode for executing recording of one page, and image data to be recorded on that page includes both a band recordable with only the black ink and a band to be recorded using both the black ink and the color inks. As described above, because the length of each of the black ink nozzle arrays g and h is longer than the length of each of the color ink nozzle arrays a to f, recording speed of the band recordable with only the black ink can be increased by using all of the nozzles included in the black ink nozzle arrays g and h. In other words, it is desirable that the band be recorded using the used nozzle group A in FIG. 11A. On the other hand, the band to be recorded using also the color inks is recorded by a recording method using the color ink nozzle arrays a to f. Thus, it is desirable that the band be recorded using the used nozzle group B in FIG. 11B. As described above, even in the case where "Line Drawing" and "Color Mode" are respectively selected as the preferred image quality and the recording mode for executing recording of one page, both an increase in recording speed and a reduction in color unevenness can be achieved by switching of the nozzles used for recording.

Now, the determination on whether the nozzle switching mode is on or off in step S1003, and a used nozzle group determined based on the determination will be described. In a case where the nozzle switching mode is off, the used nozzle group B is used for executing recording of "Line Drawing" in the color mode. Accordingly, the preliminary ejection with respect to the recording command is also executed using the used nozzle group B. On the other hand, in a case where the nozzle switching mode is on, the used nozzle group A in FIG. 11A is used for a band recordable with only the black ink, and the used nozzle group B in FIG. 11B is used for a band to be recorded also with the color inks. In other words, when the nozzle switching mode is on, all of the nozzles included in the black ink nozzle arrays g and h and the color ink nozzle arrays a to f are used for recording. Thus, the preliminary ejection with respect to the recording command has to be executed using all of the nozzles used for recording. Accordingly, in a case where the used nozzle group is switched for each recording scan while recording of one page is executed, all of the nozzles included in the nozzle arrays a to h, i.e., the used nozzle group C illustrated in FIG. 11C, are determined as the nozzles that execute the preliminary ejection.

As described above, in the determination sequence according to the present exemplary embodiment, the nozzles used for recording and the nozzles that execute the preliminary ejection are determined. When the preferred image quality is not "Line Drawing", the used nozzle group B is used for recording, and the preliminary ejection is executed by the used nozzle group B. When the preferred image quality and the recording mode are "Line Drawing" and "Black Mode", the used nozzle group A is used for recording, and the preliminary ejection is executed by the used nozzle group A. When the preferred image quality and the recording mode are "Line Drawing" and "Color Mode", the used nozzle group B is used for recording. At this time, in a case where the nozzle switching mode is off, the preliminary ejection is executed by the used nozzle group B. However, in a case where the nozzle switching mode is on, the preliminary ejection is executed by the used nozzle group C.

Figure 11D:
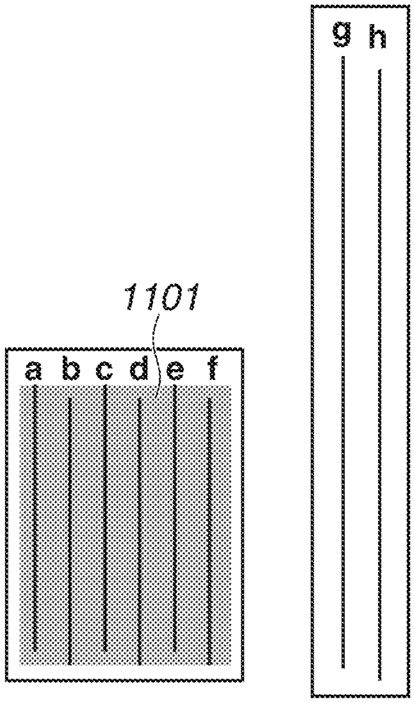

Further, even in the case where the nozzle switching mode is on in step S1003, the preliminary ejection may be executed by all of the nozzles included in the nozzle arrays a to f, i.e., a used nozzle group D in FIG. 11D, when all of the bands of the received image data are to be recorded with the color inks.

In the present exemplary embodiment, with respect to the determination results acquired in the used nozzle determination sequence in FIG. 10, preliminary ejection patterns are stored in the ROM of the control unit 72. Each of the preliminary ejection patterns specifies the nozzles that execute the pre-recording preliminary ejection and the in-recording preliminary ejection.

As described above, in the present exemplary embodiment, the preliminary ejection is not always executed by all of the nozzles, but executed by only the nozzles used for recording depending on the recording command. In this way, an amount of ink stored in the caps 41 and 42 through the preliminary ejection can be reduced, and an overflow of ink from the cap 41 or 42 can be prevented. Further, because the nozzles which execute recording also execute the preliminary ejection in a period before a recording operation is started (i.e., pre-recording preliminary ejection) and in a period between one recording scan and another recording scan (i.e., in-recording preliminary ejection), it is possible to suppress thickening of ink caused by evaporation of moisture contained in the ink from the nozzle surfaces. With the above-described configuration, ejection failure occurring in the nozzles can be prevented, so that it is possible to maintain image quality.

Figure 12:
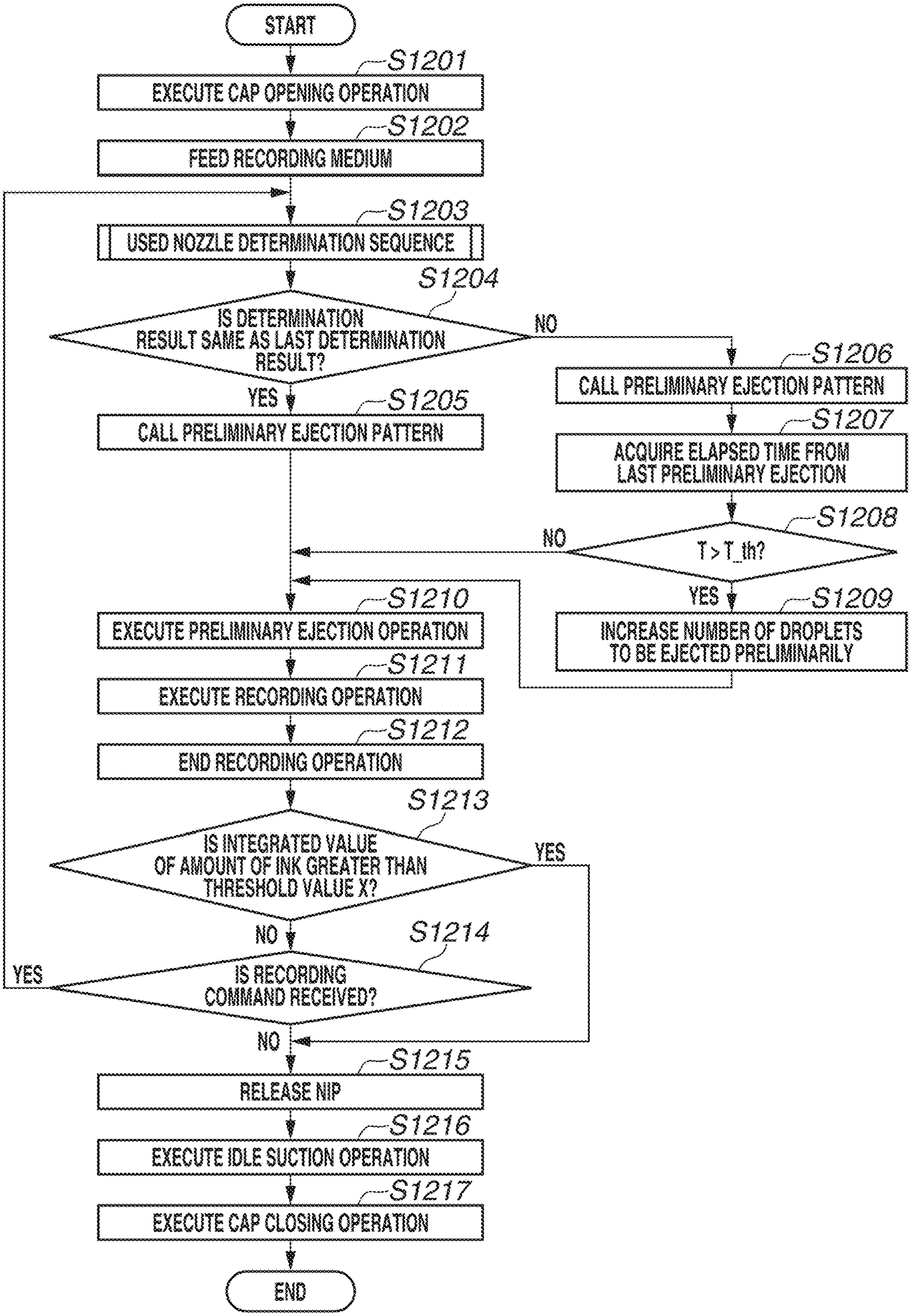
FIG. 12 is a flowchart illustrating control processing of the recording apparatus according to the first exemplary embodiment.

As illustrated in FIG. 9, in the present exemplary embodiment, after the recording operation is ended in step S97, the used nozzle determination sequence is executed repeatedly when the next recording command is received in step S99. FIG. 12 is a flowchart illustrating another example of the processing executed when a nozzle group used for recording, determined according to the next recording command, is different from the nozzle group used for recording, determined according to the last recording command. The processing other than the used nozzle determination sequence is similar to the processing illustrated in FIG. 9.

In step S1204, the CPU determines whether a determination result is the same as the determination result acquired according to the last recording command. If the determination result is the same (YES in step S1204), the processing proceeds to step S1205. In step S1205, the preliminary ejection pattern which corresponds to the determination result acquired according to the last recording command is called. Thereafter, the processing similar to the processing in FIG. 9 is executed. If the CPU determines that the determination result is different from the determination result acquired according to the last recording command (NO in step S1204), the processing proceeds to step S1206. In step S1206, a preliminary ejection pattern which corresponds to the determination result acquired according to the current recording command is called. Then, in step S1207, an elapsed time T elapsed from a time when the last preliminary ejection is executed (i.e., last preliminary ejection time) is acquired. In step S1208, the CPU determines whether the elapsed time T is greater than a threshold value T_th. If the elapsed time T is greater than the threshold value T_th (YES in step S1208), the processing proceeds to step S1209. In step S1209, the number of droplets to be ejected through the preliminary ejection is increased. At this time, the preliminary ejection may be executed not only by the nozzles determined as the nozzles that execute the preliminary ejection in the used nozzle determination sequence in step S1203, but also by the nozzles determined as the nozzles that do not execute the preliminary ejection. This is because the nozzles determined as the nozzles that do not execute the preliminary ejection include nozzles that did not execute the preliminary ejection with respect to the last recording command. Thus, thickened ink existing in these nozzles has to be discharged. Accordingly, it is desirable that the CPU execute adjustments to make various ejection conditions, i.e., an ejection frequency of the preliminary ejection, the number of droplets ejected through the preliminary ejection, and energy applied thereto for a single ejection, be greater than the ejection conditions of the normal preliminary ejection.

After the recording operation is ended, the CPU discharges the recording medium, releases the nip, and may further execute what is called a suction recovery operation to forcibly discharge ink from the nozzles in a state where the caps 41 and 42 are in contact with the recording head 717.

Figure 13:
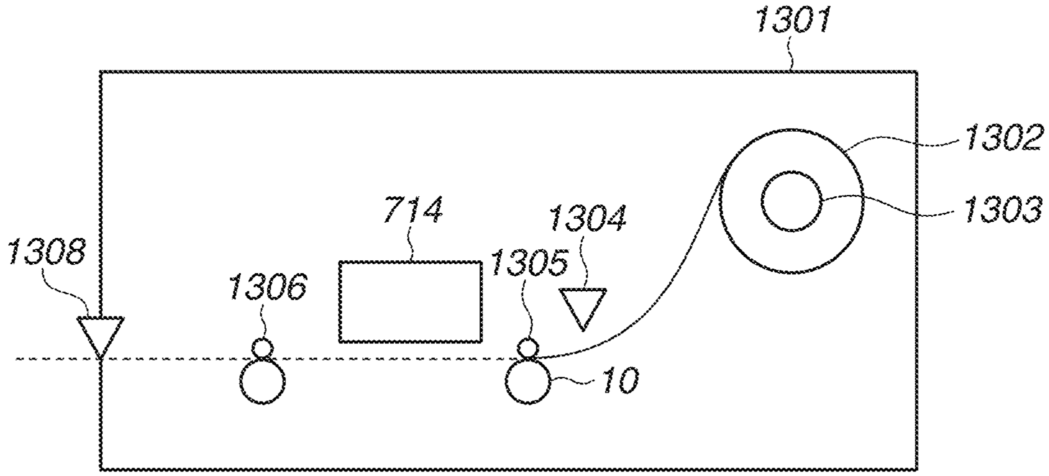
FIG. 13 is a longitudinal cross-sectional diagram illustrating an entire recording apparatus according to second and third exemplary embodiments.

FIG. 13 is a cross-sectional diagram of a recording apparatus 1301 according to a second exemplary embodiment. A recording medium 1302 is what is called a rolled paper rolled into a roll-like shape having a width of 24 inches. The rolled paper 1302 is attached to a holder 1303, and presence or absence of the rolled paper 1302 is detected by a sensor 1304. The rolled paper 1302 is nipped by a pinch roller 1305 and a conveyance roller 10 arranged opposite to the pinch roller 1305. A conveyance roller 1306 and a carriage 1307 are arranged on a downstream side thereof in the conveyance direction. The rolled paper 1302 is cut by a cutter 1308 after the recording operation is ended. As illustrated in FIG. 13, the rolled paper 1302 is nipped by the pinch roller 1305. Configurations of a conveyance driving mechanism and a recovery mechanism are similar to the configurations thereof described in the first exemplary embodiment.

Figure 14:
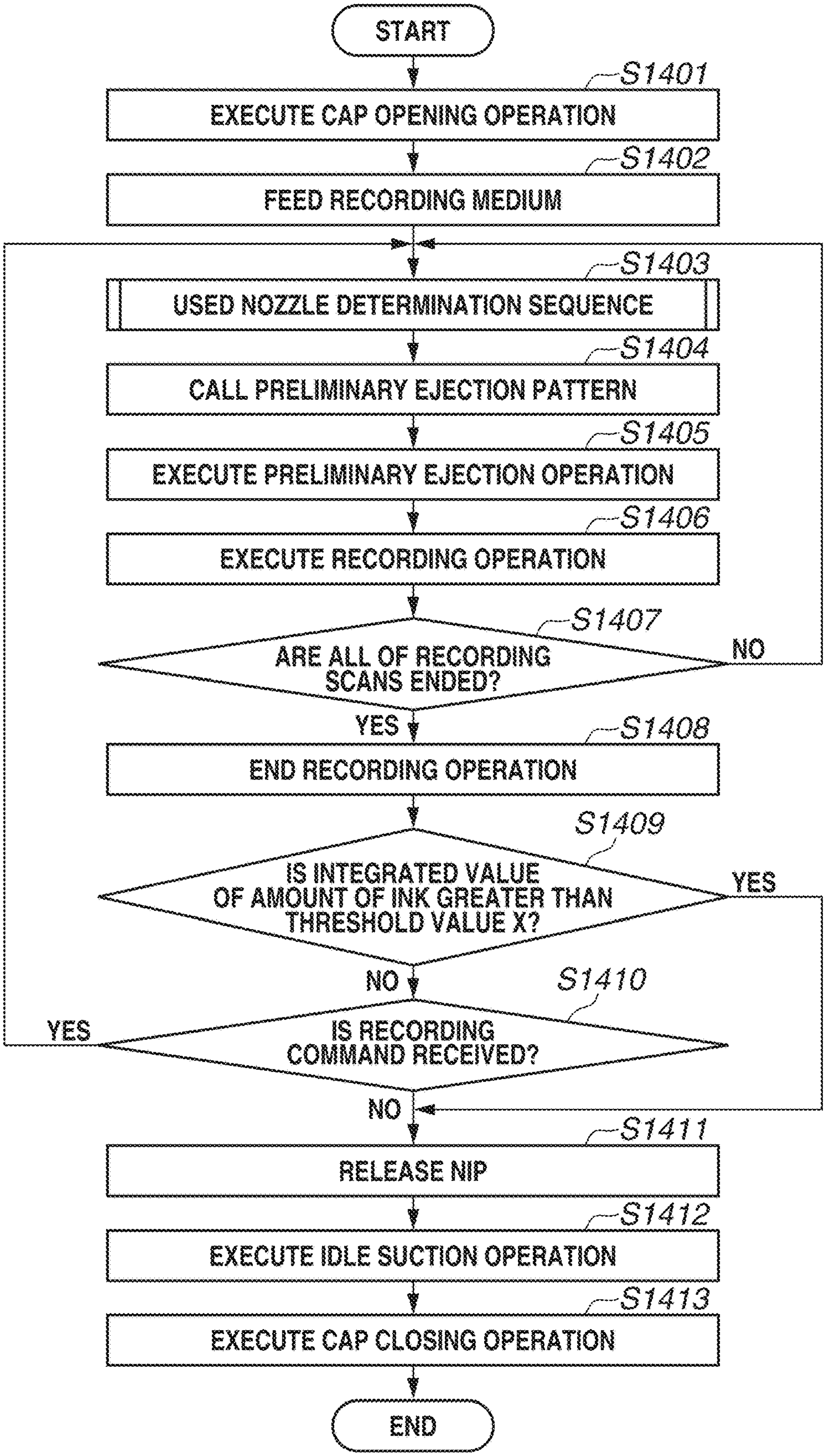
FIG. 14 is a flowchart illustrating control processing of the recording apparatus according to the second and third exemplary embodiments.

FIG. 14 is a flowchart illustrating a recording operation according to the present exemplary embodiment. In the present exemplary embodiment, while the recording head 717 reciprocally scans a recording medium to record an image thereon, recording is executed by using different nozzles for each recording scan, and the preliminary ejection is executed by using different nozzles for each recording scan. One recording scan refers to an operation of the recording unit 714 by which the recording unit 714 moves and executes recording on a recording medium for an image width in a forward direction or a backward direction. A basic operation according to the present exemplary embodiment, executed in steps S1401 and S1402 and steps S1408 to S1413, is similar to the basic operation described in the first exemplary embodiment. However, the present exemplary embodiment is different from the first exemplary embodiment in that the used nozzle determination sequence in step S1403 is repeatedly executed for each of the recording scans until it is determined that all of the recording scans is ended in step S1407.

Figure 15:
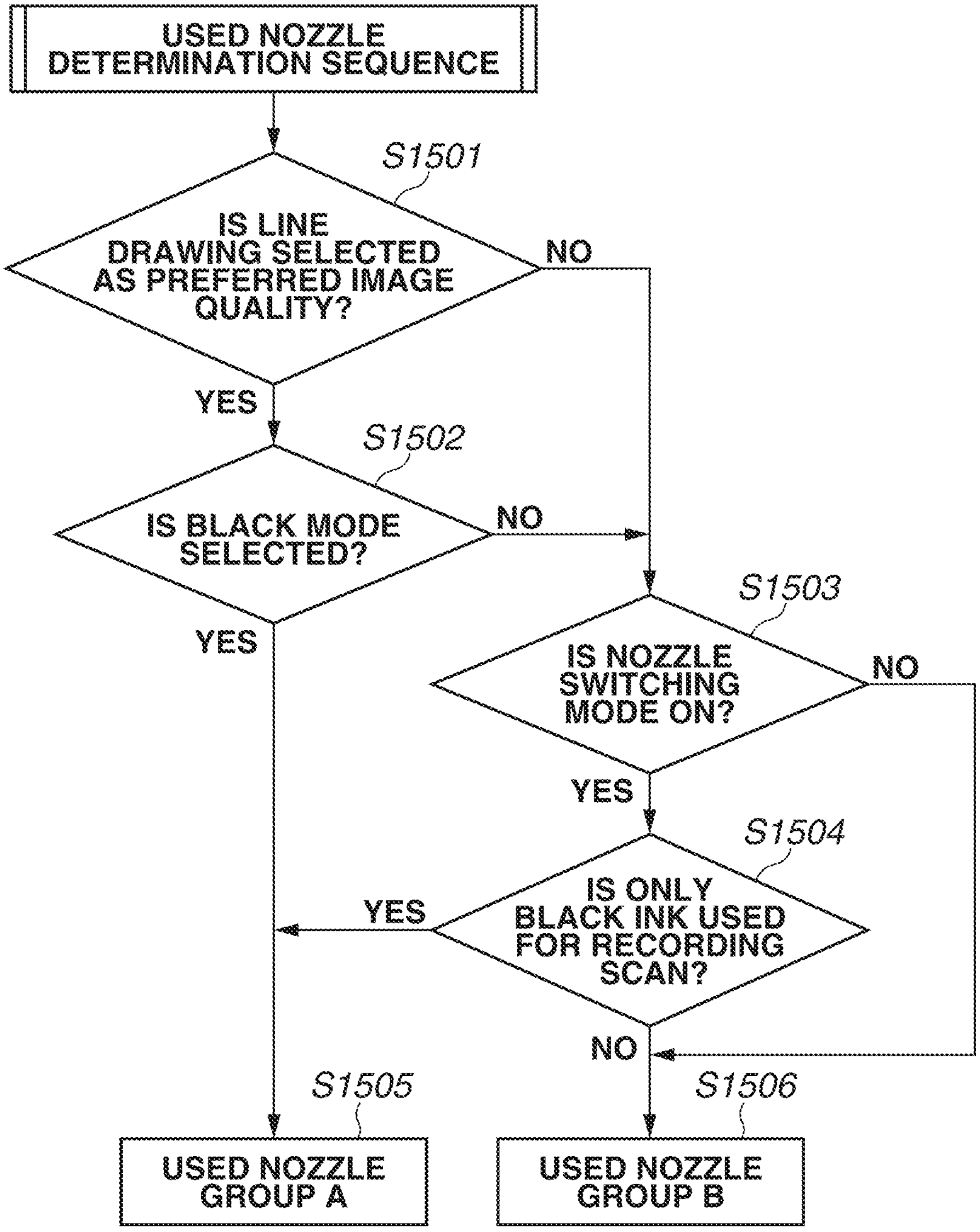
FIG. 15 is a flowchart illustrating a used nozzle determination sequence according to the second exemplary embodiment.

FIG. 15 is a flowchart illustrating an example of the used nozzle determination sequence in step S1403. In step S1501, similar to the processing in step S1001 in FIG. 10, the CPU determines whether the preferred image quality is "Line Drawing". In step S1502, similar to the processing in step S1002 in FIG. 10, the CPU determines whether the recording mode is the black mode or the color mode. In step S1503, similar to the processing in step S1003 in FIG. 10, the CPU determines whether the nozzle switching mode is on. In step S1504, based on the information about color in an image to be used for the subsequent recording scan, the CPU determines whether a band is recorded with only the black ink or with the color inks. Based on a determination result of the ink to be used, the nozzles are switched to one of the used nozzle group A (S1505) and the used nozzle group B (S1506).

Similar to the first exemplary embodiment, the nozzles included in the shaded area 1101 in FIG. 11A are used when the used nozzle group A (S1505) is selected in the used nozzle determination sequence in step S1403, and the nozzles included in the shaded areas 1101 in FIG. 11B are used when the used nozzle group B (S1506) is selected. Even if a recording mode using the color inks (i.e., the color mode) is specified for the page, an image is recorded using all of the nozzles included in the black ink nozzle arrays g and h in FIG. 11A in a case where a band to be recorded by the next recording scan is determined as a band to be recorded with only the black ink in the determination in step S1504. In the case where the recording mode is the color mode, and both the black ink and the color inks are used for an image to be recorded by the next recording scan (NO in step S1504), the image is recorded by using some of the nozzles included in the black ink nozzle arrays g and h and all of the nozzles included in the color ink nozzle arrays a to f illustrated in FIG. 11B. In the determination in step S1504, the CPU refers to the image data stored in the control unit 72 and acquires the color information of a band recorded by one recording scan.

The description will return to FIG. 14. In step S1404, based on the determination result acquired in the used nozzle determination sequence in step S1403, a preliminary ejection pattern is called for each of the recording scans. In step S1405, the preliminary ejection is executed, and in step S1406, the recording scan is executed. A series of the steps is executed until all recording scans of one page are ended. As described above, after one recording scan is ended, nozzles that execute the in-recording preliminary ejection prior to start of the next recording scan are determined for each of the recording scans. Thus, the preliminary ejection in step S1405 includes the pre-recording preliminary ejection and the in-recording preliminary ejection.

The operation executed after the recording operation is ended is similar to the operation described in the first exemplary embodiment, so that descriptions thereof are omitted. Similar to the first exemplary embodiment, in order to limit the nozzles that execute the preliminary ejection to the nozzles which are determined to be used for the recording operation of each recording scan, the preliminary ejection pattern according to the present exemplary embodiment is applied to the pre-recording preliminary ejection and the in-recording preliminary ejection. As a result, an amount of ink stored in the caps 41 and 42 through the preliminary ejection can be reduced more efficiently since the preliminary ejection is not always executed by all of the nozzles.

A configuration of the recording apparatus and a flowchart of the recording operation according to a third exemplary embodiment are similar to those described in the second exemplary embodiment, so that descriptions thereof are omitted. Generally, an ink jet recording apparatus executes masking processing on image data input to the control unit 72 to generate image data corresponding to a plurality of times of recording scans. In the present exemplary embodiment, nozzles used for each recording scan are determined depending on a mask used for the masking processing, and the preliminary ejection is executed using the mask.

Figure 16:
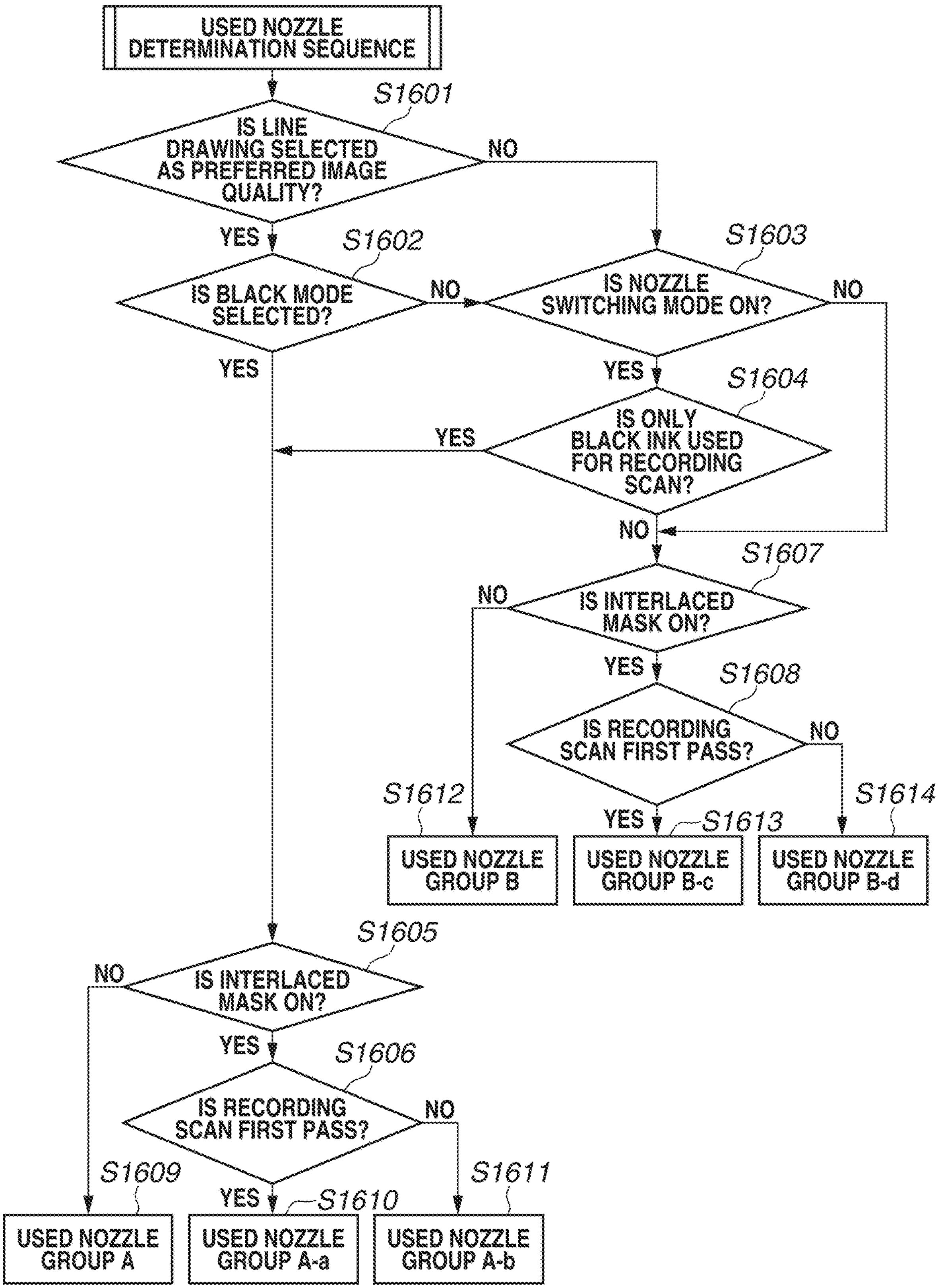
FIG. 16 is a flowchart illustrating a used nozzle determination sequence according to the third exemplary embodiment.

FIG. 16 is a flowchart illustrating an example of the used nozzle determination sequence executed in step S1403 according to the present exemplary embodiment.

In the present exemplary embodiment, the nozzles used for recording are determined based on a recording mode, a color of ink used for one recording scan, and information about a mask. As illustrated in FIG. 16, the nozzles used for recording are determined based on a recording mode determined in steps S1601 to S1603, information about an image color used for a subsequent scan determined in step S1604, information about a mask determined in step S1605 or S1607, and the number of passes determined in step S1606 or S1608.

Determination of a preferred image quality in step S1601 is similar to the determination in step S1001 in FIG. 10, determination of a black mode in step S1602 is similar to the determination in step S1002, and determination of a nozzle switching mode in step S1603 is similar to the determination in step S1003. In step S1604, similar to step S1504, the CPU determines the information about color of ink used for recording an image of one band, and determines whether only the black ink is used.

Further, in step S1605, based on the type of mask, the nozzles used for recording is determined more specifically. The mask consists of binary data of a recordable pixel (on) and a non-recordable pixel (off), and a pixel where ink is to be ejected is determined by logical multiplication of the binary data and image data. Generally, on the ink jet recording apparatus, the image data is divided into data corresponding to a plurality of times of recording scans by the masking processing. A total percentage of the recordable pixels of a plurality of masks corresponding to respective scans is 100%.

Figure 17A:
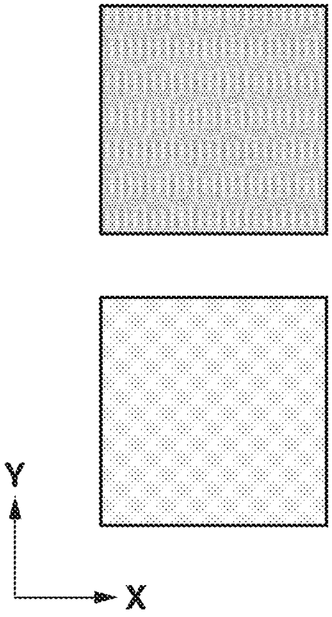
FIGS. 17A, 17B, and 17C are diagrams illustrating examples of mask patterns.
Figure 17B:
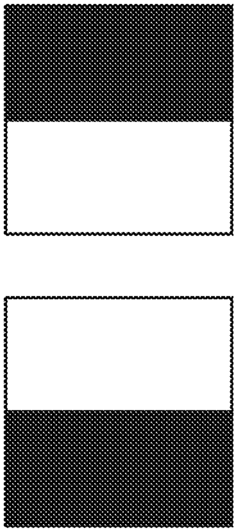
Figure 17C:
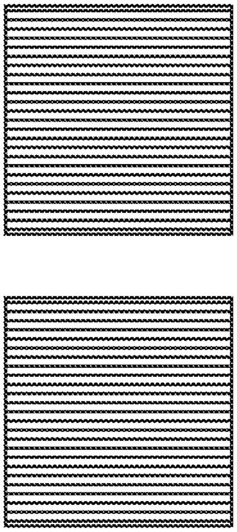
Figure 18A:
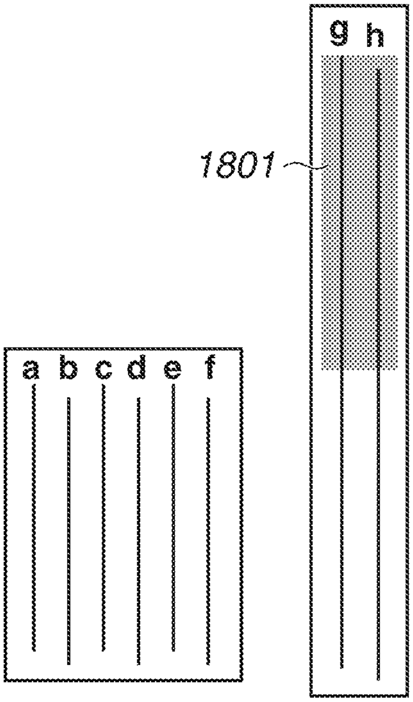
FIGS. 18A, 18B, 18C, and 18D are diagrams illustrating used nozzle groups.
Figure 18B:
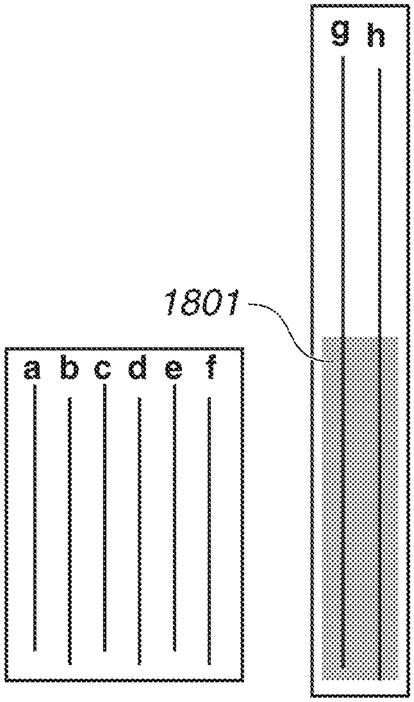
Figure 18C:
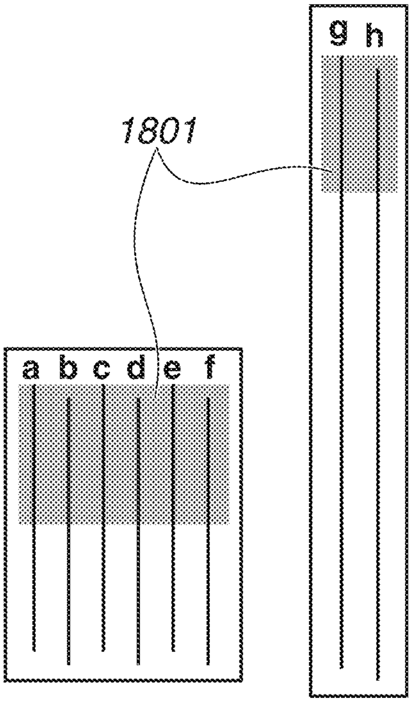
Figure 18D:
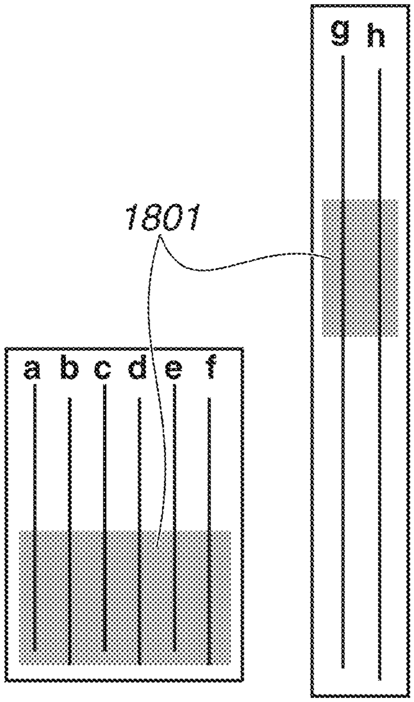

FIGS. 17A, 17B, and 17C are diagrams illustrating examples of the masks, and a random mask illustrated in FIG. 17A is widely used. In the present exemplary embodiment, a mask called "interlaced mask" illustrated in FIG. 17B or 17C, which limits the nozzles to be used in one recording scan, is used. In FIGS. 17A to 17C, an X direction represents the conveyance direction of the recording unit 714, and a Y direction represents the nozzle array direction. In step S1605 (S1607), the CPU determines whether a mask that limits the used nozzles, i.e., the interlaced mask, is used.

In a case where the mask that limits the used nozzles is used (YES in step S1605 (S1607)), the information about a division number by which the image data is divided by the mask and the information about a mask shape are acquired from the ROM of the control unit 72. Then, in step S1606 (S1608), depending on whether a recording scan is a first recording scan (first pass), a used nozzle group is determined based on the mask information. In the above-described processing in FIG. 16, the interlaced mask illustrated in FIG. 17B is used, and received image data having a predetermined width is recorded by upper and lower recording scans (two passes) using the nozzles included in the nozzle arrays of all ink colors.

FIGS. 18A, 18B, 18C, and 18D are schematic diagrams illustrating examples of used nozzle groups, and the used nozzle groups are expressed by shaded areas 1801. As illustrated in the determination results in steps S1609 to S1614 of the used nozzle determination sequence in step S1403, a used nozzle group A (S1609) corresponds to a shaded area 1101 in FIG. 11A, a used nozzle group A-a (S1610) corresponds to a shaded area 1801 in FIG. 18A, and a used nozzle group A-b (S1611) corresponds to a shaded area 1801 in FIG. 18B. Further, a used nozzle group B (S1612) corresponds to shaded areas 1101 in FIG. 11B, a used nozzle group B-c (S1613) corresponds to shaded areas 1801 in FIG. 18C, and a used nozzle group B-d (S1614) corresponds to shaded areas 1801 in FIG. 18D.

In FIG. 16, in a case where the recording mode is the black mode (YES in step S1602) or recording using only the black ink is to be executed in the subsequent recording scan (YES in step S1604) and the interlaced mask is not used (NO in step S1605), the processing proceeds to step S1609. Thus, an image is recorded by using all of the nozzles included in the black ink nozzle arrays g and h, i.e., nozzles included in the shaded area 1101 in FIG. 11A.

On the other hand, in a case where the interlaced mask in FIG. 17B is used (YES in step S1605), the processing proceeds to step S1606. Then, based on the number of times of recording scans determined in step S1606, in a case where the recording scan is the first pass (YES in step S1606), the processing proceeds to step S1610. Thus, the nozzles included in the upper halves of the black ink nozzle arrays g and h (i.e., nozzles included in the shaded area 1801 in FIG. 18A) are used. In a case where the recording scan is the second pass (NO in step S1606), the processing proceeds to step S1611. Thus, the nozzles included in the lower halves of the black ink nozzle arrays g and h (i.e., nozzles included in the shaded area 1801 in FIG. 18B) are used. Further, in a case where the recording mode is the color mode (NO in step S1602) and the used nozzle group is not switched for each recording scan (NO in step S1603), the processing proceeds to step S1607. The processing also proceeds to step S1607 in a case where the color inks are also used in the subsequent recording scan (NO in step S1604). Then, in a case where the interlaced mask is not used (NO in step S1607), the processing proceeds to step S1612. Thus, some of the nozzles included in the black ink nozzle arrays g and h and all of the nozzles included in the color nozzle arrays a to f (i.e., nozzles included in the shaded areas 1101 in FIG. 11B) are used. On the other hand, in a case where the interlaced mask illustrated in FIG. 17B is used (YES in step S1607), the processing proceeds to step S1608. Based on the number of times of recording scans determined in step S1608, in a case where the recording scan is the first pass (YES in step S1608), the processing proceeds to step S1613. Thus, the nozzles included in the upper parts of the black ink nozzle arrays g and h and the nozzles included in the upper halves of the color ink nozzle arrays a to f (i.e., nozzles included in the shaded areas 1801 in FIG. 18C) are used. In a case where the recording scan is the second pass (NO in step S1608), the processing proceeds to step S1614. Thus, the nozzles included in the lower parts of the black ink nozzle arrays g and h and the nozzles included in the lower halves of the color ink nozzle arrays a to f (i.e., nozzles included in the shaded areas 1801 in FIG. 18D) are used. Different masks may respectively be used for inks of different colors. Further, the mask is not limited to the interlaced mask illustrated in FIG. 17B or 17C, and a mask of any type can be used as long as one or more nozzles which are not used for one recording scan can be determined thereby.

Further, a different mask may be used for each of the recording modes depending on the purpose. More specifically, a random mask may be used for recording a photograph in order to reduce color unevenness of a recorded image, and an interlaced mask may be used for recording a line drawing in order to stabilize an ejection state of ink droplets. In a case where the number of times of ejection of ink in one recording scan becomes a threshold value or more, a pass may be divided using the interlaced mask in order to limit the ejection amount of ink.

Similar to the above-described exemplary embodiments, in the present exemplary embodiment, a preliminary ejection pattern is called for each scan depending on a determination result acquired in the used nozzle determination sequence, and the in-recording preliminary ejection and the recording operation are executed. The operation executed after the recording operation is ended is similar to the operation described in the above-described exemplary embodiments. Similar to the first exemplary embodiment, the preliminary ejection pattern according to the present exemplary embodiment is used to limit the nozzles that execute the preliminary ejection to the nozzles determined as a nozzle group to be used for recording. In comparison to the configurations according to the above-described exemplary embodiments, the number of nozzles that execute the preliminary ejection can be reduced, so that an overflow of ink from the cap 41 or 42 can be prevented more efficiently.

Figure 19:
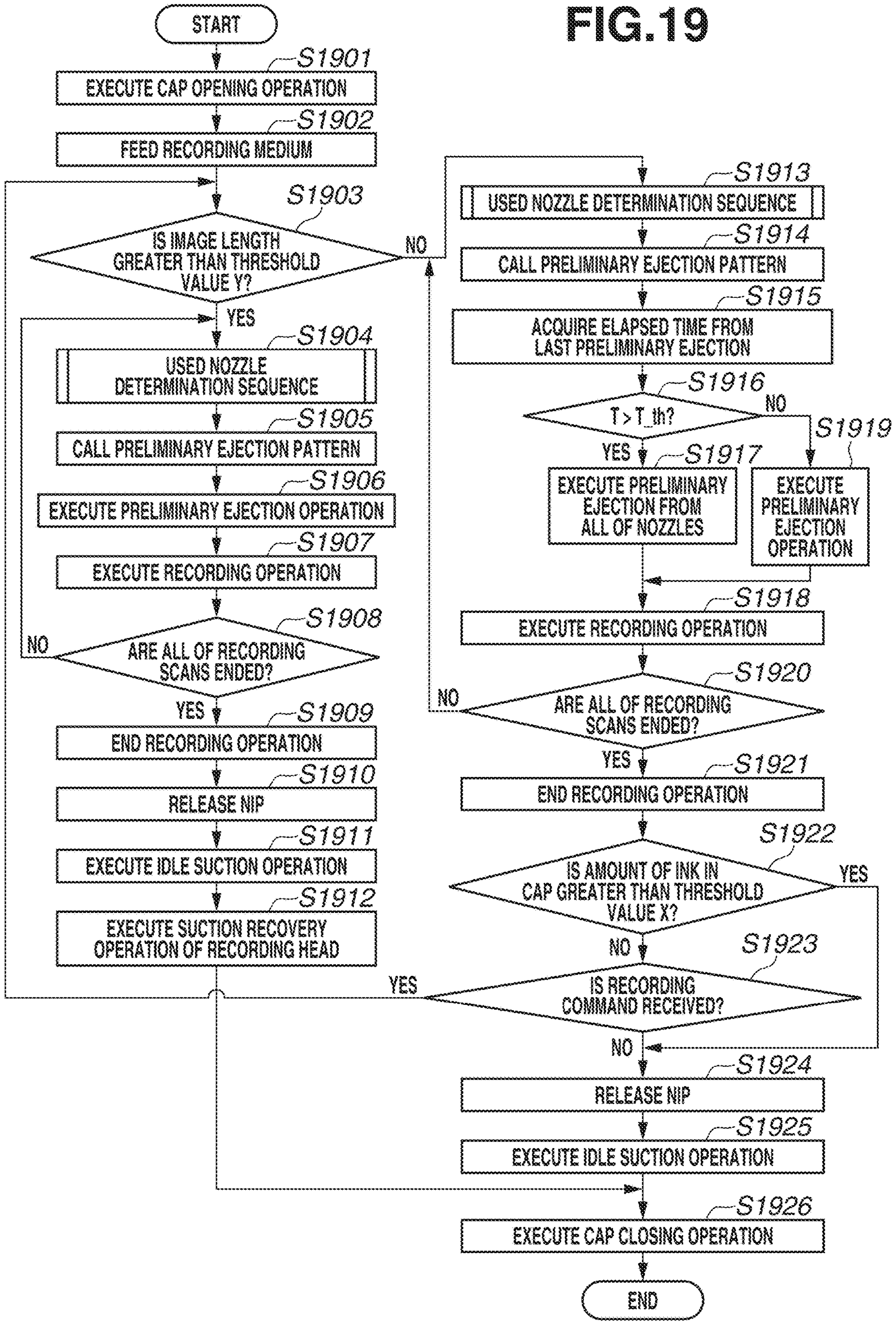
FIG. 19 is a flowchart illustrating control processing of the recording apparatus according to a fourth exemplary embodiment.

A configuration of the recording apparatus according to a fourth exemplary embodiment is similar to the configuration thereof described in the above-described exemplary embodiments. FIG. 19 is a flowchart illustrating a recording operation according to the present exemplary embodiment. Different recording operations are executed depending on a length in the conveyance direction of the received image data. In a case where an input image length is greater than a threshold value Y (YES in step S1903), the processing proceeds to step S1904. Similar to the processing according to the above-described exemplary embodiments, in step S1905, a preliminary ejection pattern is acquired depending on a determination result acquired in the used nozzle determination sequence in step S1904. Then, in step S1906, the pre-recording preliminary ejection and the in-recording preliminary ejection are executed by only the nozzle group to be used for recording. Thereafter, in step S1907, an image is recorded. After the recording operation is ended, or before the next recording operation is started, in step S1910, the recording medium is discharged and a nip is released regardless of a count value of an amount of ink in the cap and presence or absence of the recording command. Thereafter, in step S1911, idle suction processing is executed. Then, in step S1912, the suction recovery operation of the recording head 717 is executed. In step S1912, in addition to execution of the suction recovery operation of the recording head 717, a recovery operation which makes an ejection frequency of the preliminary ejection, the number of droplets ejected through the preliminary ejection, and energy applied thereto for ejecting ink, be greater than those of the preliminary ejection executed in step S1906 may also be executed. On the other hand, in a case where the input image length is a threshold value Y or less (NO in step S1903), the processing proceeds to step S1913. Similar to the processing according to the above-described exemplary embodiments, in step S1919, depending on the determination result acquired in the used nozzle determination sequence in step S1913, the pre-recording preliminary ejection and the in-recording preliminary ejection are executed by only the nozzle group used for recording. On the other hand, in a case where a time elapsed from the last preliminary ejection time of the nozzles not used for recording is greater than a threshold value T_Th (YES in step S1916), the processing proceeds to step S1917. In step S1917, the preliminary ejection is performed by all of the nozzles included in the shaded area 1101 in FIG. 11C regardless of the determination result acquired in the used nozzle determination sequence.

In the present exemplary embodiment, in a case where the input image length is the threshold value Y or less, ink ejected through the preliminary ejection is less likely to overflow from the cap 41 or 42. Thus, the preliminary ejection may be executed by all of the nozzles for each recording scan without executing the used nozzle determination sequence. Further, the preliminary ejection may be executed by all of the nozzles at regular intervals instead of being executed for each recording scan. After ending the recording operation, if the amount of ink in the cap is the threshold value X or less (NO in step S1922), the CPU waits for the next recording command for a certain period of time. In a case where the recording command is received (YES in step S1923), the processing returns to step S1903, so that the processing in step S1903 and subsequent steps is executed repeatedly. In a case where the cap capacity is greater than the threshold value X (YES in step S1922), in step S1924, the recording medium is discharged, and the nip is released. Then, in step S1925, the idle suction processing is executed. In step S1926, the cap closing operation is executed. Then, the recording operation is ended.

As described above, when the length of the input image is long, the number of times of in-recording preliminary ejection is increased. Thus, the preliminary ejection is executed by only the nozzle group to be used for the recording operation. With this configuration, an amount of ink ejected and stored in the cap 41 or 42 through the preliminary ejection can be reduced, so that it is possible to prevent an overflow of ink from the cap 41 or 42. Further, the suction recovery operation of the recording head 717 is executed after the recording operation is ended, so that thickening of ink occurring in the vicinities of the nozzles not used for recording can be prevented. On the other hand, when the image length is short, the preliminary ejection is executed by all of the nozzles, so that it is possible to prepare for the next recording command.

Figure 20:
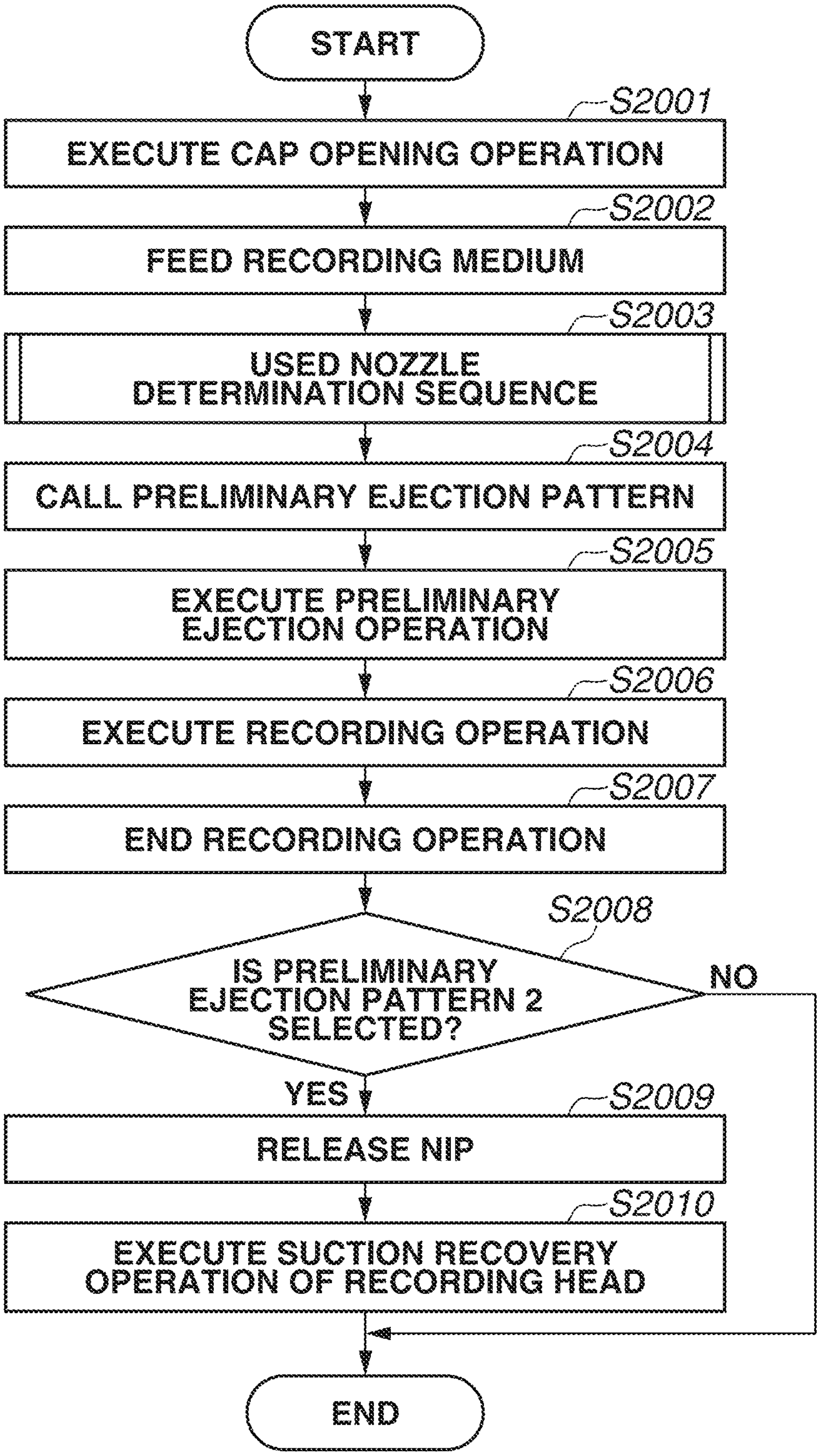
FIG. 20 is a flowchart illustrating a recording operation according to a fifth exemplary embodiment.

A configuration of a recording apparatus according to a fifth exemplary embodiment is similar to the configuration thereof described in the third exemplary embodiment. FIG. 20 is a flowchart illustrating a recording operation according to the present exemplary embodiment. In step S2001, the cap opening operation is executed. In step S2002, a recording medium is fed. In step S2003, a used nozzle determination sequence is executed based on the received image data. Processing to be executed after the used nozzle determination sequence is similar to the processing described in the above-described exemplary embodiment, so that descriptions thereof are omitted.

Figure 21:
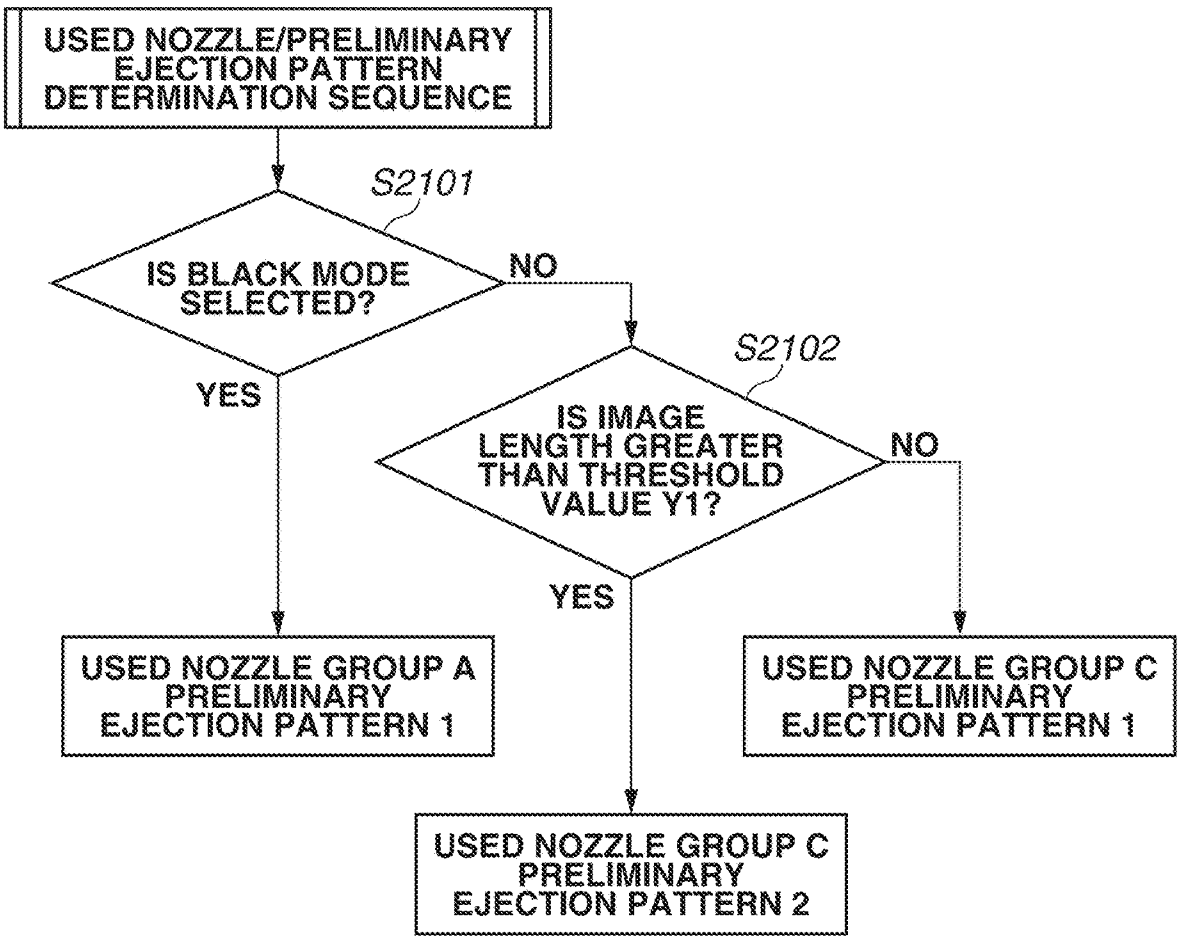
FIG. 21 is a flowchart illustrating a used nozzle determination sequence according to a fifth exemplary embodiment.

FIG. 21 is a flowchart illustrating the used nozzle determination sequence executed in the present exemplary embodiment. The number of droplets ejected through the preliminary ejection is illustrated in table 1. In a case where the recording mode is determined as the black mode (YES in step S2101), "Used Nozzle Group A" is selected, and the number of droplets ejected from the nozzles included in the black nozzle arrays g and h is determined. Based on the preliminary ejection pattern illustrated in table 1, "i Droplets" is set as the number of droplets ejected through the preliminary ejection. On the other hand, in a case where the recording mode is not determined as the black mode (NO in step S2101), "Used Nozzle Group C" is selected.

Then, in step S2102, the CPU determines whether the input image length is greater than a threshold value Y1. In a case where the CPU determines that the input image length is the threshold value Y1 or less (NO in step S2102), "Preliminary Ejection Pattern 1" is selected, and the number of droplets ejected through the preliminary ejection is set based on table 1. Herein, "i Droplets" is set as the number of droplets preliminarily ejected from both of the nozzles used and not used for recording, included in the black ink nozzle arrays g and h. Then, "k Droplets" is set as the number of droplets preliminarily ejected from the nozzles included in the color ink nozzle arrays a to f.

In a case where the input image length is greater than the threshold value Y1 (YES in step S2102), "Preliminary Ejection Pattern 2" is selected. Then, "i Droplets" is set as the number of droplets preliminarily ejected from the nozzles used for recording, included in the black ink nozzle arrays g and h, and "j Droplets" is set as the number of droplets preliminarily ejected from the nozzles not used for recording included in the black ink nozzle arrays g and h. Herein, "j" is a number smaller than "i". In addition, "k Droplets" is set as the number of droplets preliminarily ejected from the nozzles included in the color ink nozzle arrays a to f.

TABLE 1

| Number of Droplets Ejected Through Preliminary Ejection [Droplets] | Preliminary Ejection Pattern 1 | Preliminary Ejection Pattern 2 |
|---|---|---|
| Black Ink Nozzles Used for Recording | i | i |
| Black Ink Nozzles Not Used for Recording | i | j |
| Color Ink Nozzles | k | k |

When the recording operation is ended in step S2007 in FIG. 20, in step S2008, the CPU determines whether the preliminary ejection pattern selected in the used nozzle determination sequence is "Preliminary Ejection Pattern 2". In a case where "Preliminary Ejection Pattern 2" is selected (YES in step S2008), the processing proceeds to step S2009. In step S2009, the nip is released. Then, in step S2010, the suction recovery operation of the recording head 717 is executed. In a case where "Preliminary Ejection Pattern 2" is not selected (NO in step S2008), the processing is ended.

In the present exemplary embodiment, as the recovery operation, the suction recovery operation of the recording head 717 is executed. However, the preliminary ejection of a certain degree, which makes it possible to recover the recording head 717, may be executed. In this case, the recovery operation can be executed without releasing the nip.

In a sixth exemplary embodiment, a configuration of a recording apparatus, a flowchart of a recording operation, and a preliminary discharge pattern are similar to those described in the above-described exemplary embodiments. Thus, descriptions thereof are omitted. In a used nozzle determination sequence according to the present exemplary embodiment, a threshold value of the number of recording passes is also taken into consideration.

Figure 22:
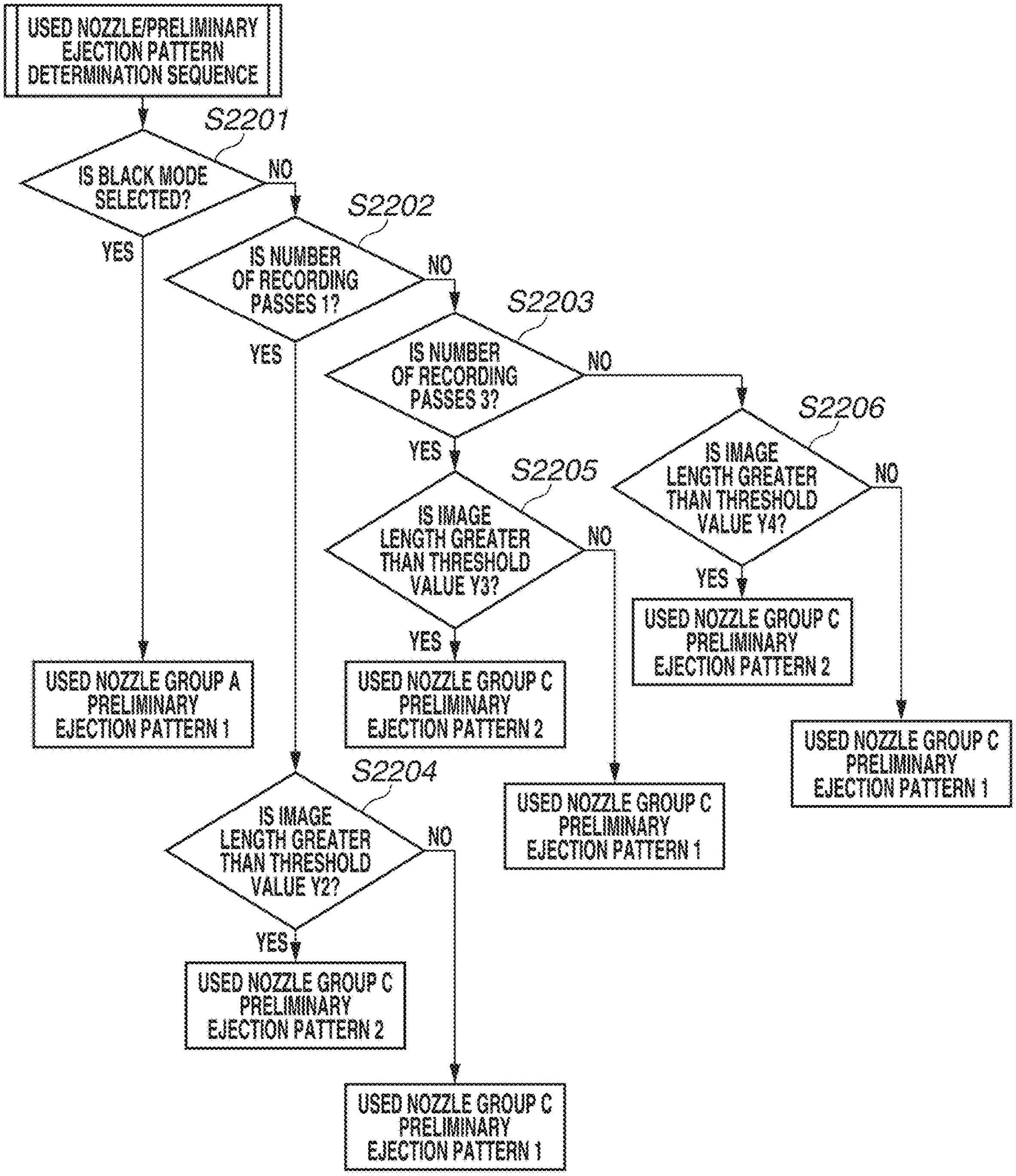
FIG. 22 is a flowchart illustrating a used nozzle determination sequence according to a sixth exemplary embodiment.

FIG. 22 is a flowchart illustrating the used nozzle determination sequence according to the present exemplary embodiment. First, in step S2201, in a case where the recording mode is determined as the black mode (YES in step S2201), the used nozzle group A is selected, and the number of droplets preliminarily ejected from the nozzles included in the black ink nozzle arrays g and h is determined. Based on table 1, "i Droplets" is set as the number of droplets ejected through the preliminary ejection. On the other hand, in step S2201, in a case where the recording mode is not determined as the black mode (NO in step S2201), the processing proceeds to step S2202. Then, in steps S2202 and S2203, the number of recording passes of the determined recording mode is determined based on the preferred image quality and the type of recording medium. In the present exemplary embodiment, depending on the preferred image quality and the type of recording medium selected for the color mode, the number of recording passes is determined as any one of "1", "3", and "5".

In a case where the number of recording passes is "1" (YES in step S2202), the processing proceeds to step S2204. In step S2204, the CPU determines whether the image length is greater than a threshold value Y2. In a case where the input image length is the threshold value Y2 or less (NO in step S2204), "Preliminary Ejection Pattern 1" is selected. Then, based on table 1, "i Droplets" is set as the number of droplets preliminarily ejected from both of the nozzles used and not used for recording included in the black ink nozzle arrays g and h, and "k Droplets" is set as the number of droplets preliminarily ejected from the nozzles included in the color ink nozzle arrays a to f. In a case where the input image length is greater than the threshold value Y2 (YES in step S2204), "Preliminary Ejection Pattern 2" is selected. Then, "i Droplets" is set as the number of droplets preliminarily ejected from the nozzles used for recording included in the black ink nozzle arrays g and h, and "j Droplets" is set as the number of droplets preliminarily ejected from the nozzles not used for recording and included in the black ink nozzle arrays g and h. Herein, "j" is a number smaller than "i". Further, "k Droplets" is set as the number of droplets preliminarily ejected from the nozzles included in the color ink nozzle arrays a to f. "Used Nozzle Group C" is selected with respect to both of the above-described cases.

In step S2202, in a case where the number of recording passes is not "1" (NO in step S2202), the processing proceeds to step S2203. In step S2203, the CPU determines whether the number of recording passes is "3". In a case where the CPU determines that the number of recording passes is "3" (YES in step S2203), the processing proceeds to step S2205. In step S2205, the CPU determines whether the image length is greater than a threshold value Y3. Determination executed in step S2205 is similar to the determination executed in step S2204, so that descriptions thereof are omitted. In step S2203, in a case where the CPU determines that the number of recording passes is not "3" (NO in step S2203), the number of recording passes should be "5". Thus, the CPU advances the processing to step S2206 without executing the determination of the number of recording passes. Processing executed in step S2206 is similar to the processing executed when the number or recording passes is "1" or "3", except when a threshold value for determining the image length is "Y4". Thus, descriptions thereof are omitted.

As described above, in the present exemplary embodiment, in comparison to the configuration according to the fifth exemplary embodiment where the image length determination is executed by using the same threshold value for all of the recording modes, the number of droplets preliminarily ejected from the nozzles not used for recording can be increased in a larger number of recording cases. As a result, it is possible to prevent ink from sticking to the nozzles.

In a seventh exemplary embodiment, a configuration of a recording apparatus, a flowchart of a recording operation, and a preliminary discharge pattern are similar to those described in the fifth exemplary embodiments. Thus, descriptions thereof are omitted. In the present exemplary embodiment, a preliminary ejection pattern is determined based on the amount of ink stored in the cap 41 (42), estimated from the image data and the recording operation.

Figure 23:
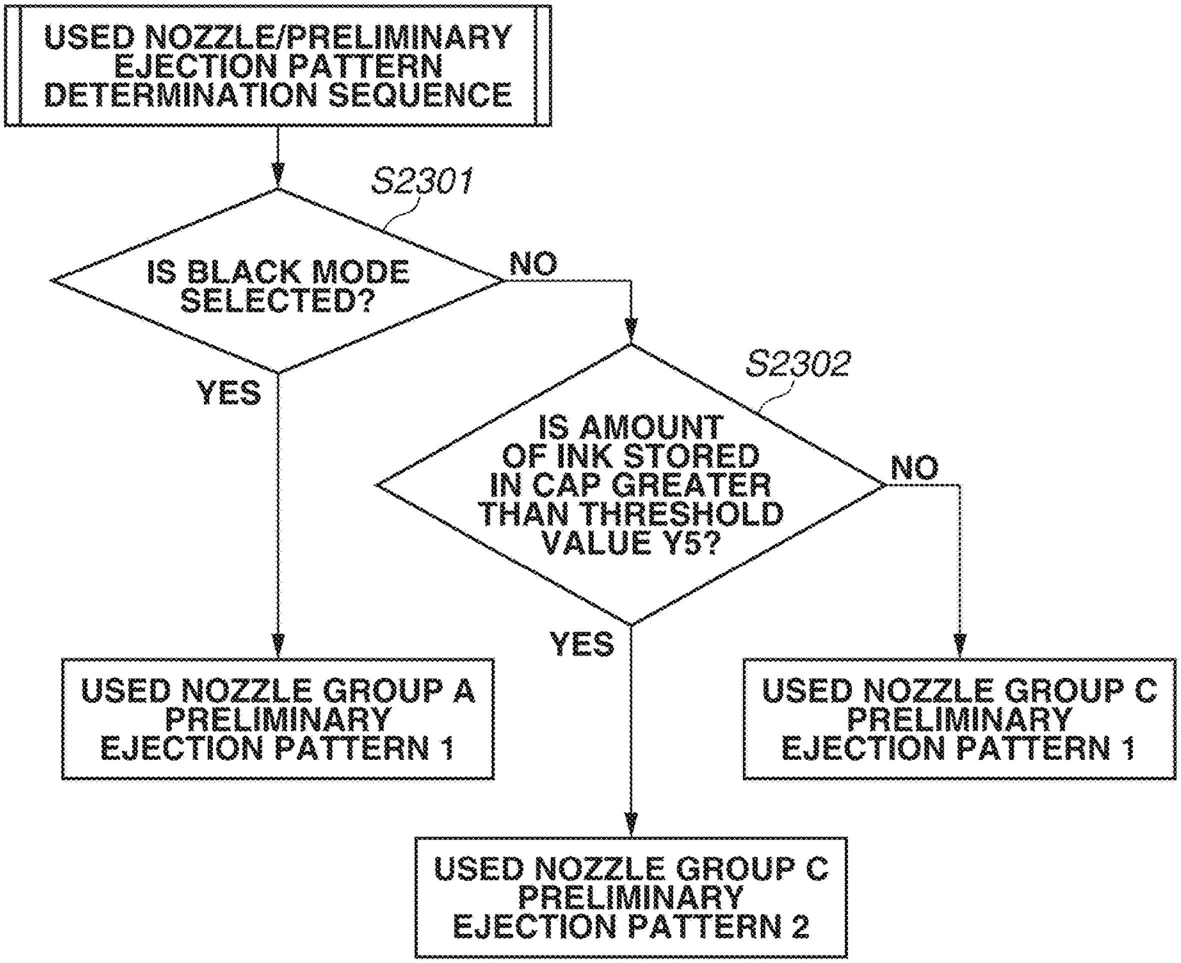
FIG. 23 is a flowchart illustrating a determination sequence of used nozzles and a preliminary ejection pattern according to a seventh exemplary embodiment.

FIG. 23 is a flowchart illustrating a determination sequence of used nozzles and the preliminary ejection pattern. Similar to the fifth exemplary embodiment, in step S2301, in a case where the recording mode is the black mode (YES in step S2301), the used nozzle group A is selected, and the number of droplets preliminarily ejected from the nozzles included in the black ink nozzle arrays g and h is determined. Based on table 1, "i Droplets" is set as the number of droplets preliminarily ejected from the nozzles included in the black ink nozzle arrays g and h, and "k Droplets" is set as the number of droplets preliminarily ejected from the nozzles included in the color ink nozzle arrays a to f. In a case where the recording mode is not determined as the black mode (NO in step S2301), the processing proceeds to step S2302. In step S2302, the preliminary ejection pattern is determined by the below-described procedures.

First, based on table 2, an image length is acquired from the image data for each job. Further, based on the image and the determined recording mode, the number of recording passes for recording the image is acquired. Then, based on the image length, the number of scans necessary to record the image is calculated. At this time, in a case where the amount of ink ejected to the image is great, the number of necessary scans is calculated in consideration of monitor division control for dividing the number of recording passes. The number of droplets necessary to be ejected through the in-recording preliminary ejection is calculated from the calculated number of scans. The amount of ink stored in the cap 41 (42) is estimated from a total number of droplets ejected through the pre-recording and post-recording preliminary ejections as well as the amount of black ink ejected through the preliminary ejection.

In step S2302, with respect to each of the jobs, the CPU determines whether an estimated amount of ink stored in the cap 41 (42) is greater than a threshold value Y5. In a case where the estimated amount thereof is the threshold value Y5 or less (NO in step S2302), "Preliminary Ejection Pattern 1" is selected. Then, based on table 1, "i Droplets" is set as the number of droplets preliminarily ejected from both of the nozzles used and not used for recording included in the black ink nozzle arrays g and h, and "k Droplets" is set as the number of droplets preliminarily ejected from the nozzles included in the color ink nozzle arrays a to f. In a case where the estimated amount of ink stored in the cap 41 (42) is greater than the threshold value Y5 (YES in step S2302), "Preliminary Ejection Pattern 2" is selected. Then, "i Droplets" is set as the number of droplets preliminarily ejected from the nozzles used for recording included in the black ink nozzle arrays g and h, and "j Droplets" is set as the number of droplets preliminarily ejected from the nozzles not used for recording included in the black ink nozzle arrays g and h. Herein, "j" is a number smaller than "i". Further, "k Droplets" is set as the number of droplets preliminarily ejected from the nozzles included in the color ink nozzle arrays a to f. The recovery operation executed after ending of the recording operation is similar to the recovery operation described in the fifth exemplary embodiment, so that descriptions thereof are omitted.

With the above-described configuration, in comparison to the fifth and sixth exemplary embodiments, the number of droplets preliminarily ejected from the nozzles not used for recording can be increased while taking appropriate measures to monitor division relevant to image data. Therefore, it is possible to prevent ink from sticking to the nozzles more efficiently.

TABLE 2

| | | Job | | | | | |
|---|---|---|---|---|---|---|---|
| | | 1 | 2 | 3 | 4 | 5 | 6 |
| Image Data | Image | A | A | A | B | B | B |
| | Image Length (mm) | 914 | 914 | 4000 | 914 | 914 | 4000 |
| Recording Mode | Preferred Image Quality | Line Drawing | Photo | Photo | Line Drawing | Photo | Photo |
| | Quality Level | Standard | Fine | Fine | Standard | Fine | Fine |
| | Number of Passes [Pass(es)] | 1 | 5 | 5 | 2 | 10 | 10 |
| Number of Droplets Ejected Through Preliminary Ejection | Number of Scans [Scans] | 100 | 500 | 2393 | 200 | 1000 | 4375 |
| | Pre-Recording/ Post-Recording [Droplets] | 100 | 100 | 100 | 100 | 100 | 100 |
| | In-Recording [Droplets] | 500 | 2500 | 12965 | 1000 | 5000 | 21875 |
| | Total [Droplets] | 600 | 2600 | 12065 | 1100 | 5100 | 21975 |
| Estimated Amount of Ink Stored in Cap [mg] | | 8 | 34 | 157 | 14 | 66 | 286 |

With the above-described configuration, it is possible to prevent an overflow of ink from the cap while preventing lowering of image quality caused by ejection failure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-209576, filed Dec. 23, 2021, and No. 2022-147450, filed Sep. 15, 2022, which are hereby incorporated by reference herein in their entirety.

What is claimed is:

1. An ink jet recording apparatus comprising:

a recording unit configured to execute a recording operation of an image and on which nozzle arrays each including a plurality of nozzles for ejecting ink onto a recording medium are arranged;

a cap configured to receive ink preliminarily ejected from the recording unit; and a control unit configured to control an ejection operation of ink ejected from the recording unit in response to receipt of a recording command to cause an amount of ink ejected from a first nozzle group in a first preliminary ejection executed prior to the recording operation of the image to be smaller than an amount of ink ejected from a second nozzle group different from the first nozzle group in a second preliminary ejection executed prior to the recording operation of the image in a case where the recording command includes an instruction for recording the image by using the second nozzle group without using the first nozzle group among the plurality of nozzles.

2. The ink jet recording apparatus according to claim 1, wherein, in the case where the recording command includes the instruction, the control unit controls the ejection operation to cause the amount of ink ejected in the first preliminary ejection to be substantially zero.

3. The ink jet recording apparatus according to claim 1, wherein, where N is a natural number, the control unit controls the ejection operation to cause an amount of ink ejected from the first nozzle group in a third preliminary ejection executed in a period between an N-th recording operation and an (N+1)-th recording operation to be smaller than an amount of ink ejected from the second nozzle group in a fourth preliminary ejection executed in the period between the N-th recording operation and the (N+1)-th recording operation.

4. The ink jet recording apparatus according to claim 3, wherein, in the case where the recording command includes the instruction, the control unit controls the ejection operation to cause the amount of ink ejected in the third preliminary ejection to be substantially zero.

5. The ink jet recording apparatus according to claim 3, further comprising a nip unit configured to nip the recording medium, wherein the recording medium is nipped by the nip unit while the fourth preliminary ejection is being executed.

6. The ink jet recording apparatus according to claim 5, further comprising a motor serving as a driving source of a nip operation executed by the nip unit, wherein the motor also serves as a driving source of a discharge operation for discharging ink stored in the cap in a state where the recording unit is separated from the cap.

7. The ink jet recording apparatus according to claim 1 further comprising a conveyance unit configured to convey the recording medium in a first direction, wherein the control unit controls the ejection operation to cause ink to be ejected to the recording medium while the recording unit is executing a recording scan in a second direction intersecting with the first direction, and wherein an area recording operation of the image executed on a predetermined unit area of the recording medium is completed through a plurality of times of recording scans executed by the recording unit.

8. The ink jet recording apparatus according to claim 1, wherein the nozzle arrays, each including the plurality of nozzles arrayed, are black ink nozzle arrays for ejecting a black ink, wherein the recording unit further includes color ink nozzle arrays each including plural nozzles arrayed and for ejecting a color ink, and wherein, as a recording mode, the recording command includes at least any one of a black mode for recording the image by using only the black ink or a color mode for recording the image by using at least the color ink.

9. The ink jet recording apparatus according to claim 8, wherein a length of each of the black ink nozzle arrays where the plurality of nozzles are arrayed is shorter than a length of each of the color ink nozzle arrays where the plural nozzles are arrayed.

10. The ink jet recording apparatus according to claim 8, wherein the control unit controls the ejection operation to use both the first nozzle group and the second nozzle group of the black ink nozzle arrays in the black mode and to use the second nozzle group without using the first nozzle group of the black ink nozzle arrays in the color mode.

11. The ink jet recording apparatus according to claim 10, wherein, in a case where the recording command includes the color mode, the amount of ink ejected in the first preliminary ejection is zero.

12. The ink jet recording apparatus according to claim 10, wherein the recording command further includes information describing whether a nozzle switching mode for switching between the black mode and the color mode for each recording scan is on or off, and wherein, in a case where the recording command includes the color mode and the information describes that the nozzle switching mode is on, the control unit controls the ejection operation to cause all of the nozzles included in the black ink nozzle arrays to execute a prior preliminary ejection prior to the recording operation.

13. The ink jet recording apparatus according to claim 12, wherein, where N is a natural number and in the case where the recording command includes the color mode and the information describes that the nozzle switching mode is on, the control unit controls the ejection operation to cause all of the nozzles included in the black ink nozzle arrays to execute a period preliminary ejection in a period between an N-th recording operation and an (N+1)-th recording operation executed by the recording unit.

14. An ink jet recording apparatus comprising:

a recording unit configured to execute a recording operation of an image and on which nozzle arrays each including a plurality of nozzles for ejecting ink onto a recording medium are arranged;

a cap configured to receive ink preliminarily ejected from the recording unit;

a control unit configured to control an ejection operation of ink ejected from the recording unit in response to receipt of a recording command; and a determination unit configured to determine whether an image length included in the recording command is greater than a predetermined threshold value, wherein, in a case where the recording command includes an instruction for recording the image by using a second nozzle group different from a first nozzle group without using the first nozzle group among the plurality of nozzles and the determination unit determines that the image length is greater than the predetermined threshold value, a number of droplets ejected from the first nozzle group in a first preliminary ejection executed prior to the recording operation of the image is less than a number of droplets ejected from the second nozzle group in a second preliminary ejection executed prior to the recording operation of the image.

15. The ink jet recording apparatus according to claim 14, wherein the predetermined threshold value is specified based on a number of recording passes included in the recording command.

16. An ink jet recording apparatus comprising:

a recording unit configured to execute a recording operation of an image and on which nozzle arrays each including a plurality of nozzles for ejecting ink onto a recording medium are arranged;

a cap configured to receive ink preliminarily ejected from the recording unit;

a control unit configured to control an ejection operation of ink ejected from the recording unit in response to receipt of a recording command;

a calculation unit configured to calculate an amount of ink stored in the cap based on at least any one of a number of recording passes, a number of scans necessary to record an image, a number of droplets ejected in a preliminarily ejection, and an image length, included in the recording command; and a determination unit configured to determine whether the amount of ink calculated by the calculation unit is greater than a predetermined threshold value, wherein, in a case where the recording command includes an instruction for recording the image by using a second nozzle group different from a first nozzle group without using the first nozzle group among the plurality of nozzles and the determination unit determines that the amount of ink is greater than the predetermined threshold value, a number of droplets ejected from the first nozzle group in a first preliminary ejection executed prior to the recording operation of the image is less than a number of droplets ejected from the second nozzle group in a second preliminary ejection executed prior to the recording operation of the image.

* * * * *